United States Patent [19]

Kubo et al.

[11] Patent Number: 4,769,826
[45] Date of Patent: Sep. 6, 1988

[54] VIDEO ENCODING APPARATUS

[75] Inventors: Tsutomu Kubo; Kenichi Asano; Hiroaki Kikuchi; Mitsuyoshi Suzuki, all of Tokyo, Japan

[73] Assignee: Mitsubishi Denki Kabushiki Kaisha, Tokyo, Japan

[21] Appl. No.: 819,067

[22] Filed: Jan. 15, 1986

[30] Foreign Application Priority Data

| Jan. 16, 1985 | [JP] | Japan | 60-5453 |
| Mar. 5, 1985 | [JP] | Japan | 60-42905 |
| May 16, 1985 | [JP] | Japan | 60-104505 |
| Jun. 13, 1985 | [JP] | Japan | 60-127258 |
| Jul. 16, 1985 | [JP] | Japan | 60-156307 |
| Jul. 16, 1985 | [JP] | Japan | 60-156308 |
| Sep. 5, 1985 | [JP] | Japan | 60-196207 |
| Nov. 15, 1985 | [JP] | Japan | 60-255990 |

[51] Int. Cl.⁴ .................... H04B 1/66; H04N 7/137
[52] U.S. Cl. ................................ 375/122; 358/136
[58] Field of Search ................ 358/12, 136, 133; 375/122

[56] References Cited

U.S. PATENT DOCUMENTS 4,558,350 12/1985 Murakami ........................ 358/12
4,560,977 12/1985 Murakami et al. ............... 364/807
4,670,851 6/1987 Murakami et al. ............... 358/12

OTHER PUBLICATIONS

T. Murakami et al., Institute of Electronics and Comm. Engineers of Japan, "Interframe Coding Using Adaptive Vector Quantizer", Apr. 3, 1984, pp. 1-8.

Primary Examiner—Robert L. Griffin
Assistant Examiner—Marianne Huseman
Attorney, Agent, or Firm—Bernard, Rothwell & Brown

[57] ABSTRACT

In a video encoding apparatus of the invention, a video camera is provided with a moving direction detecting means for detecting movement of the camera in preset moving direction and outputting a detecting signal, a movement information generator is installed for operating the displacement amount of the video camera based on the detecting signal outputted from the moving direction detecting means and calculating the specific position on the memory corresponding to the operated displacement amount of the video camera and outputting the position to a reference signal generator, and plural blocks stored to the specific position on the frame memory are read based on output from the movement information generator.

4 Claims, 23 Drawing Sheets

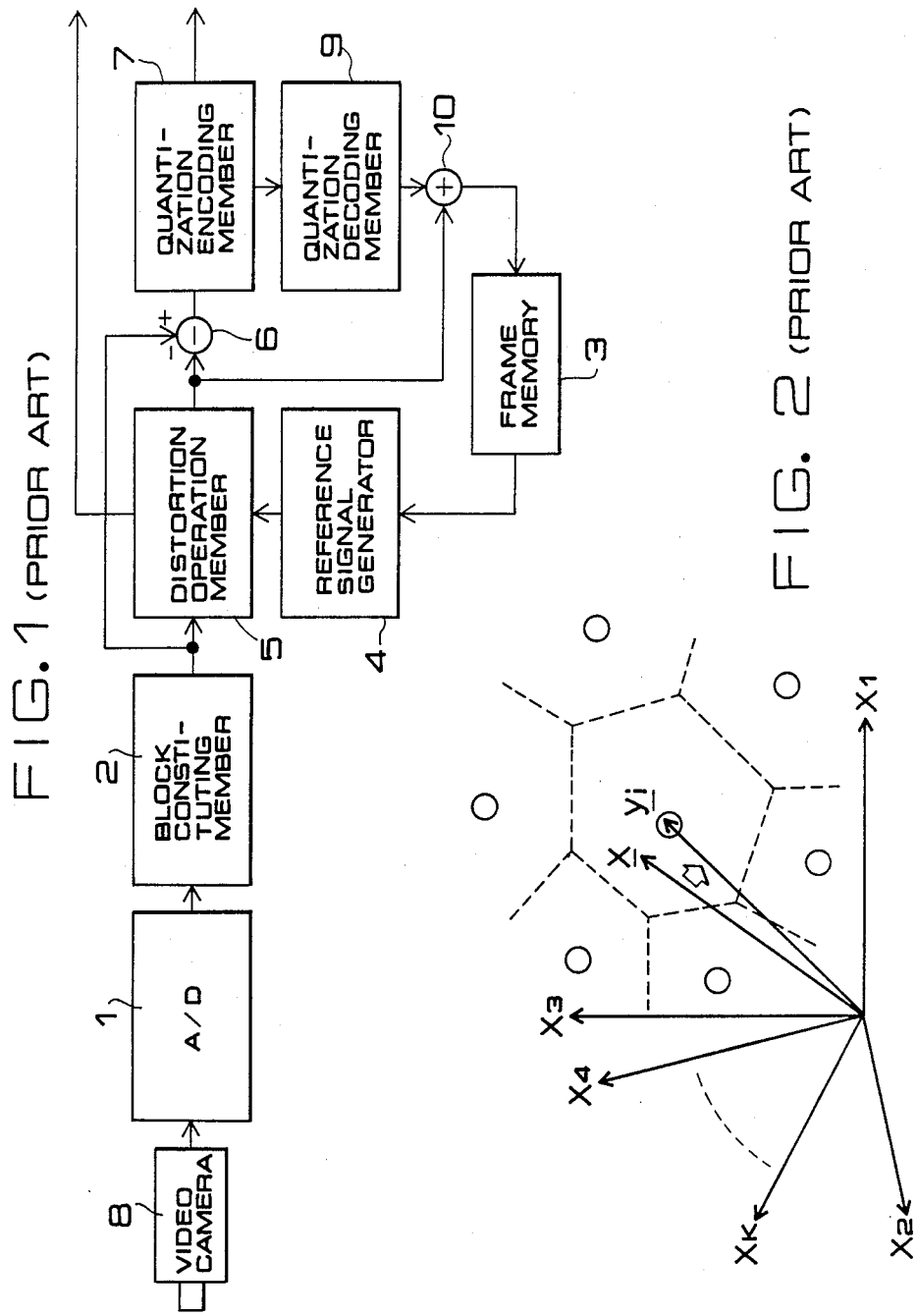

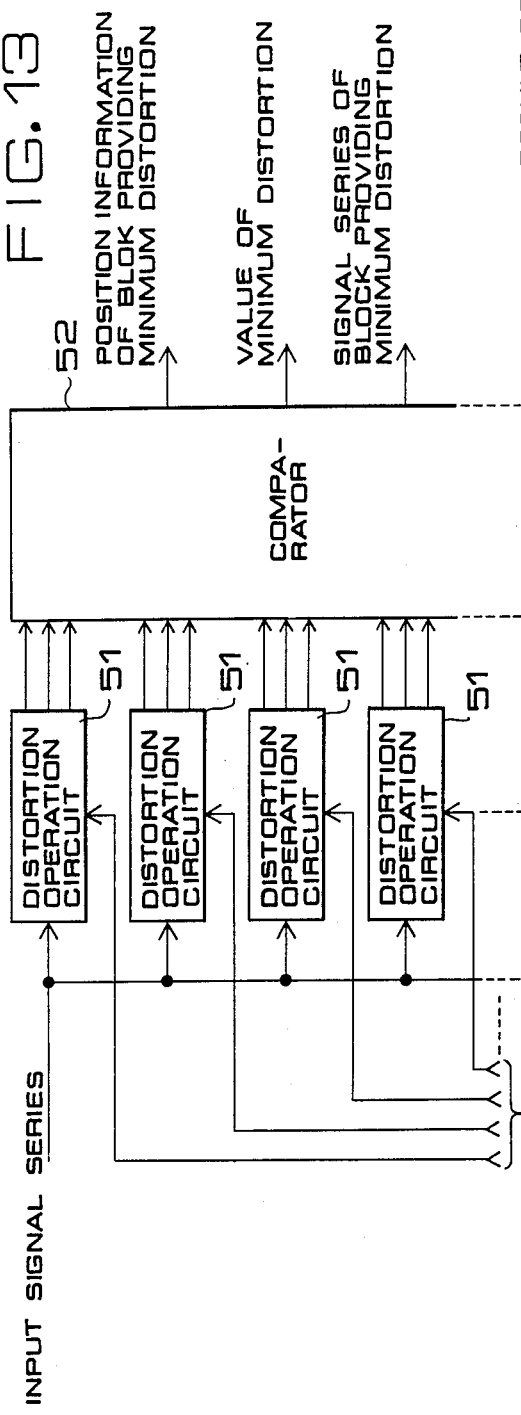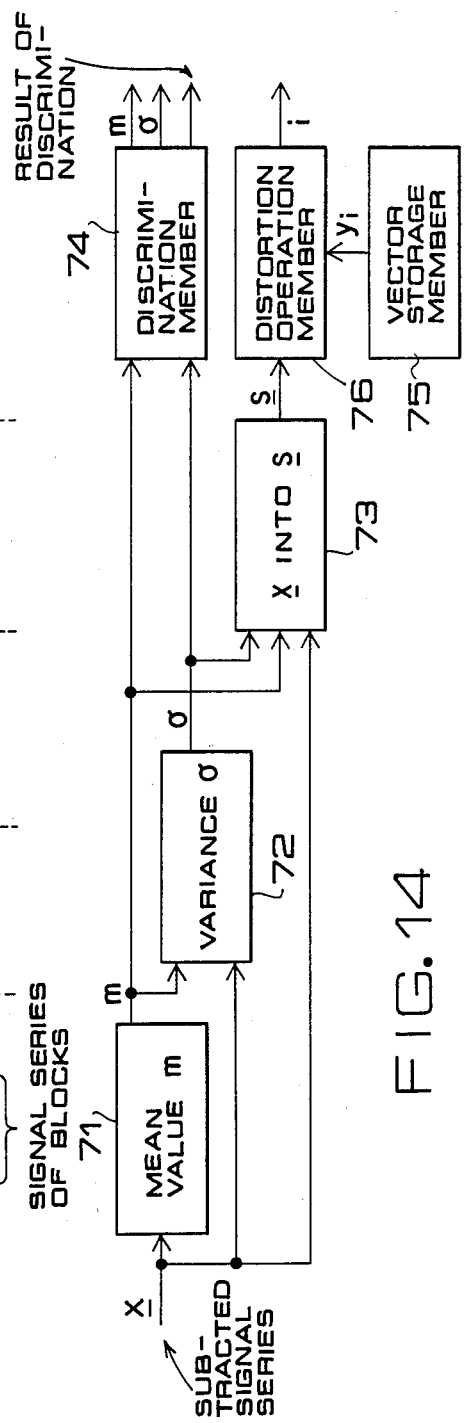

FIG. 15
| CONDITION<br>INFORMATION | MINIMUM DISTORTION ≥ THRESHOLD VALUE | | MINIMUM DISTORTION < THRESHOLD VALUE | |
|---|---|---|---|---|
| | VALID | INVALID | VALID | INVALID |
| POSITION INFORMATION $l$ | ○ | ○ | ○ | ○ |
| VALID /INVALID | ○ | ○ | ○ | ○ |
| INDEX i | ○ | × | × | × |
| MEAN VALUE m | ○ | × | × | × |
| VARIANCE $\sigma$ | ○ | × | × | × |
○ : CODE ASSIGNED
× : CODE NOT ASSIGNED
FIG. 17(A)
(PRIOR ART)
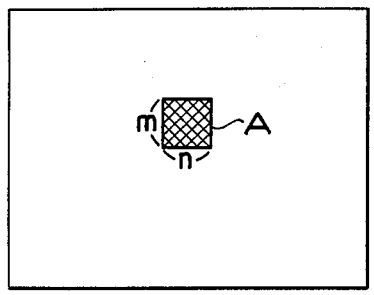
FIG. 17(B)
(PRIOR ART)
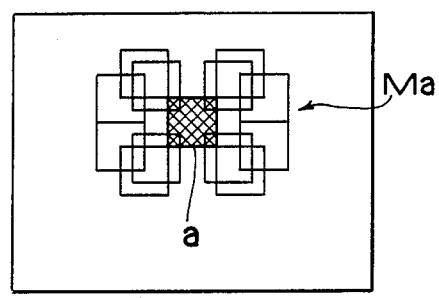

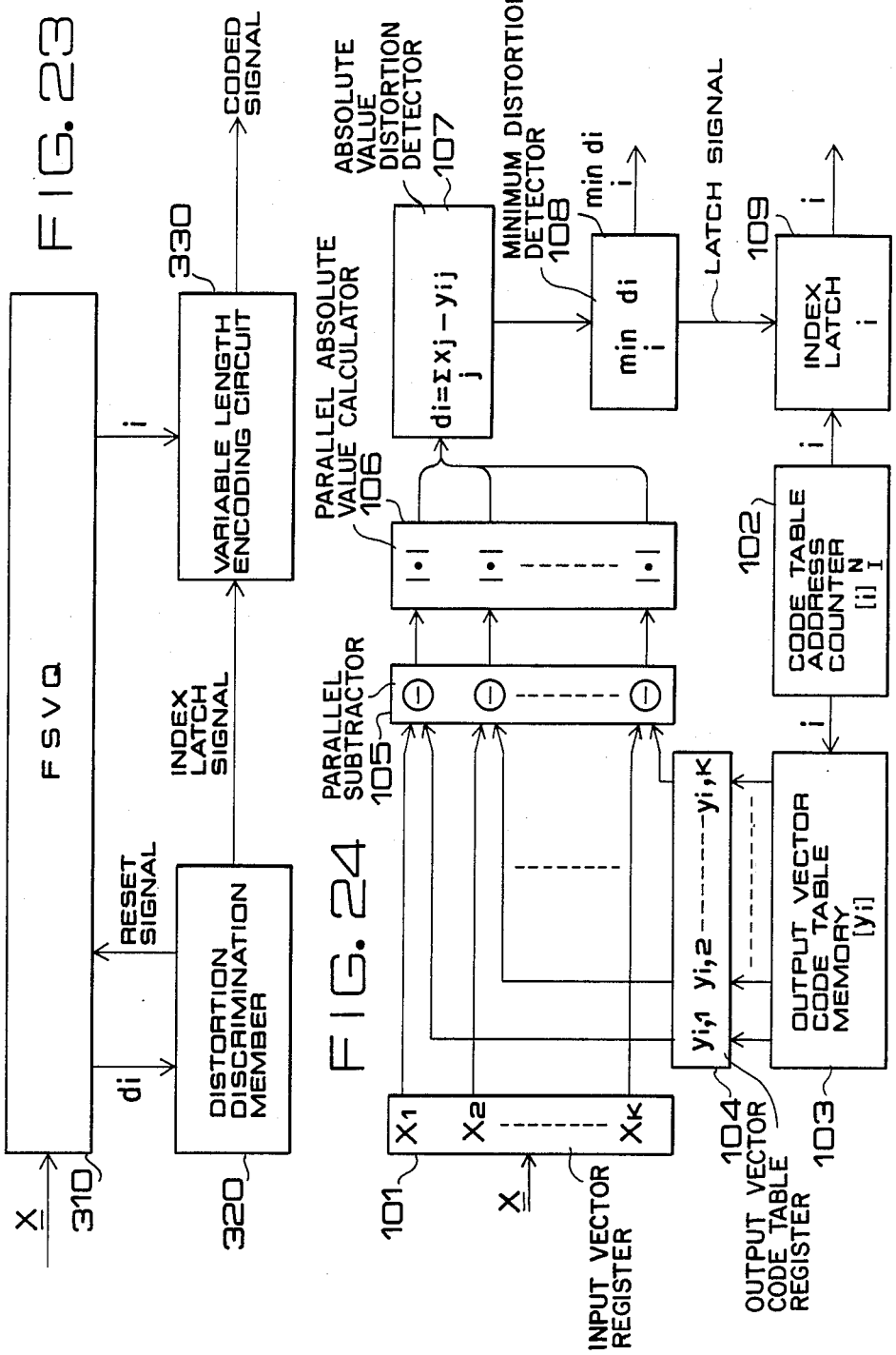

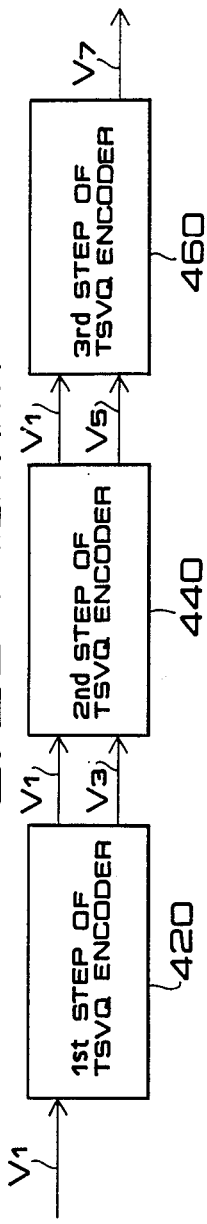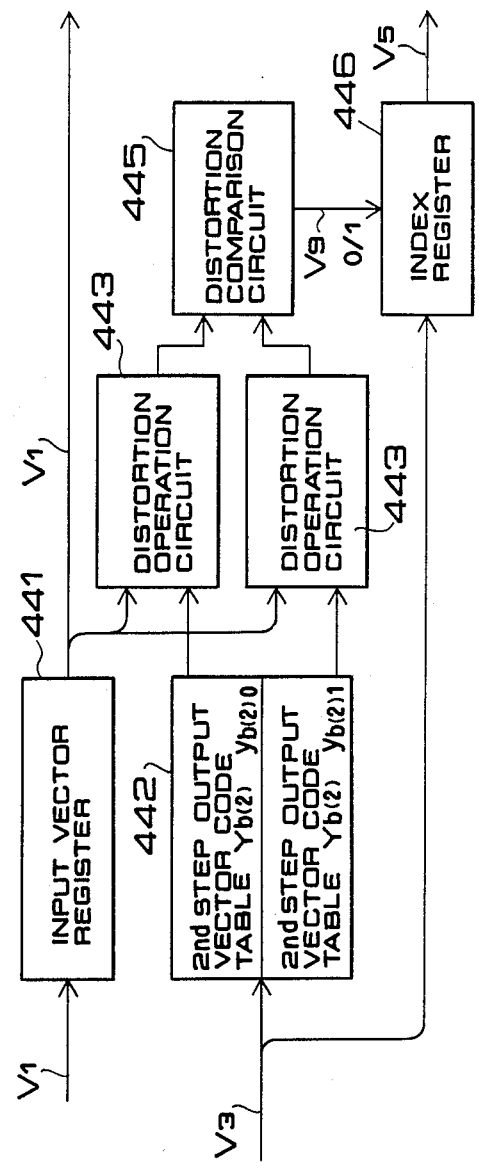
FIG. 25 (PRIOR ART)
FIG. 26 (PRIOR ART)

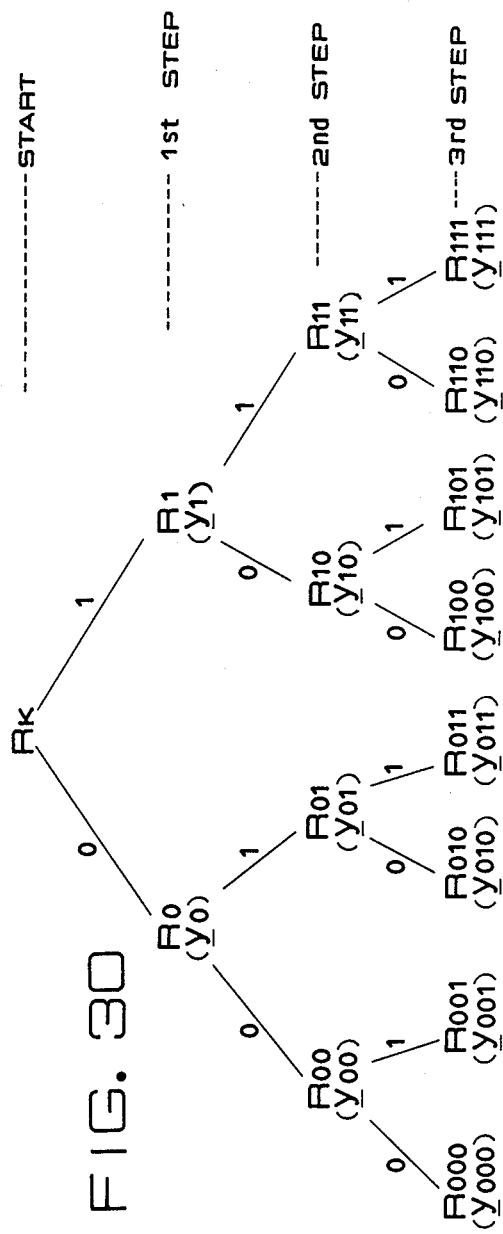

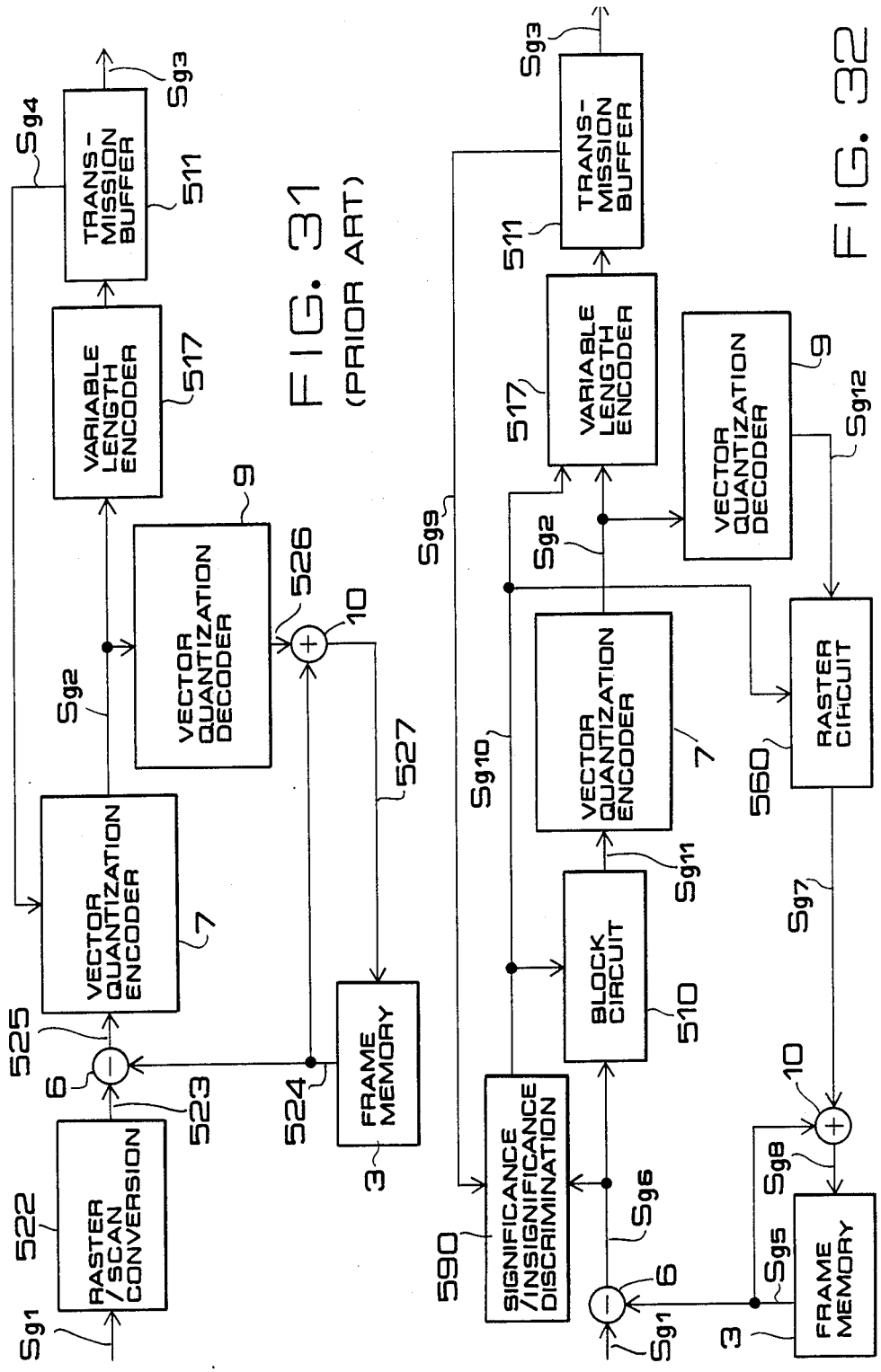

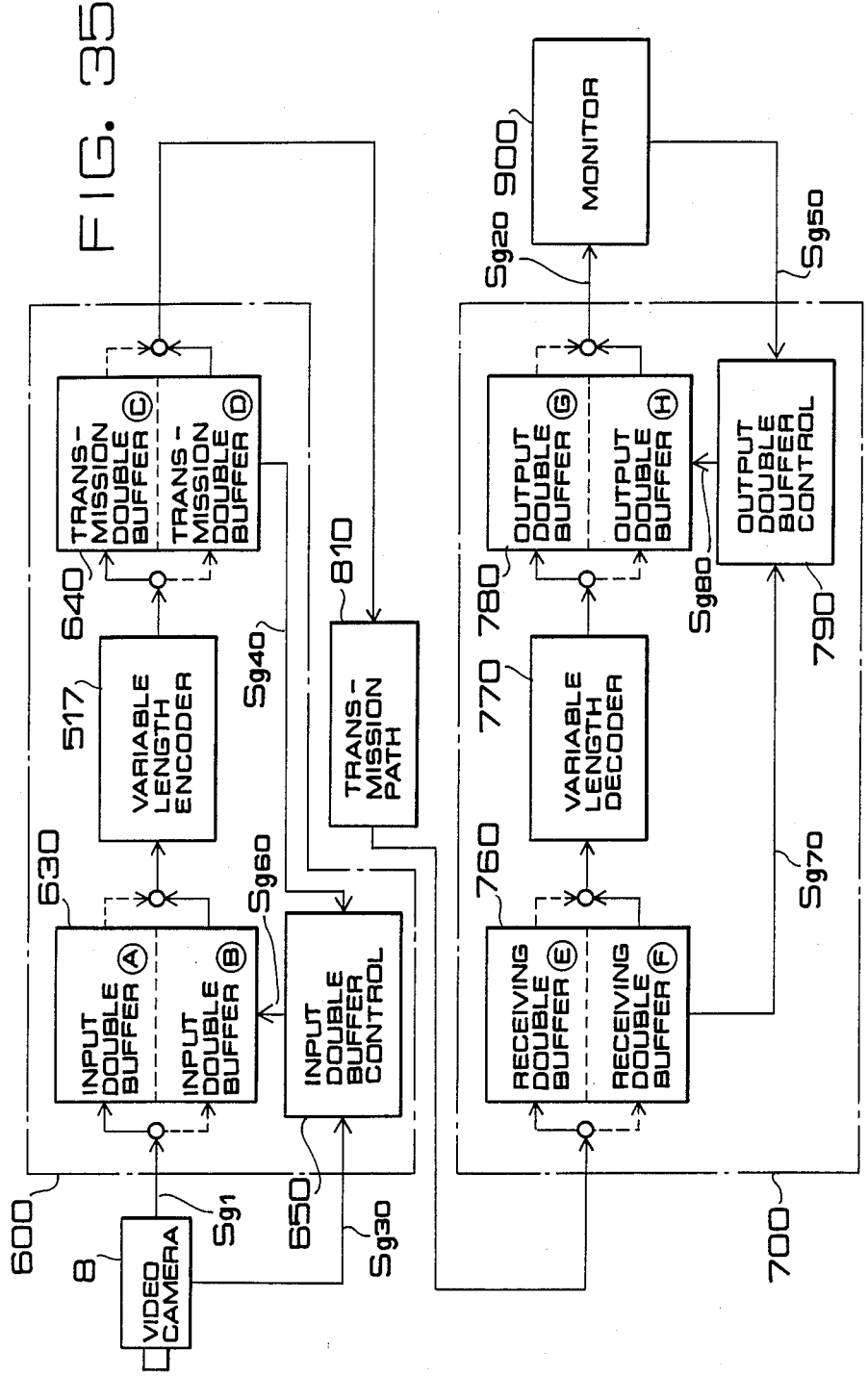

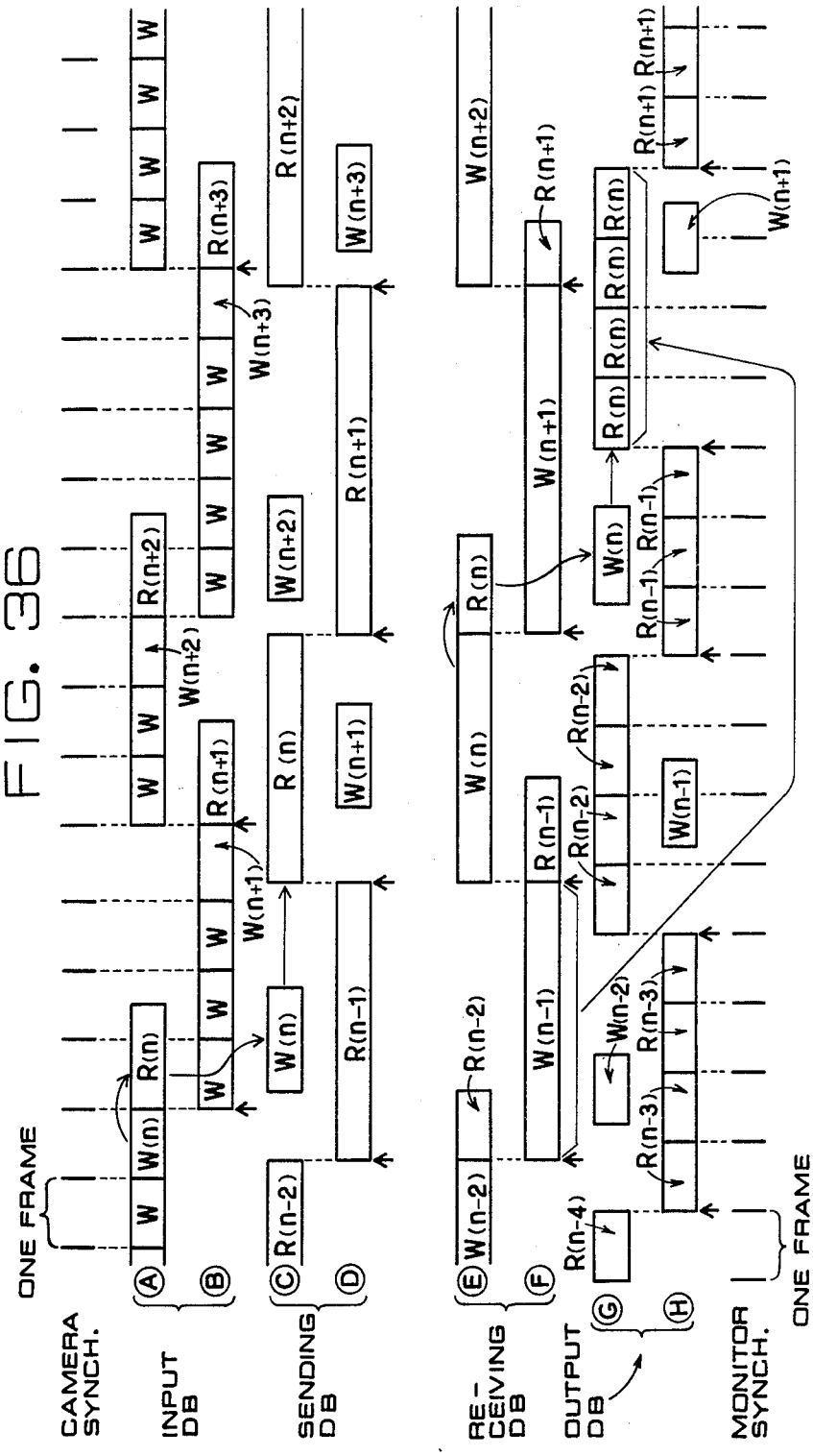

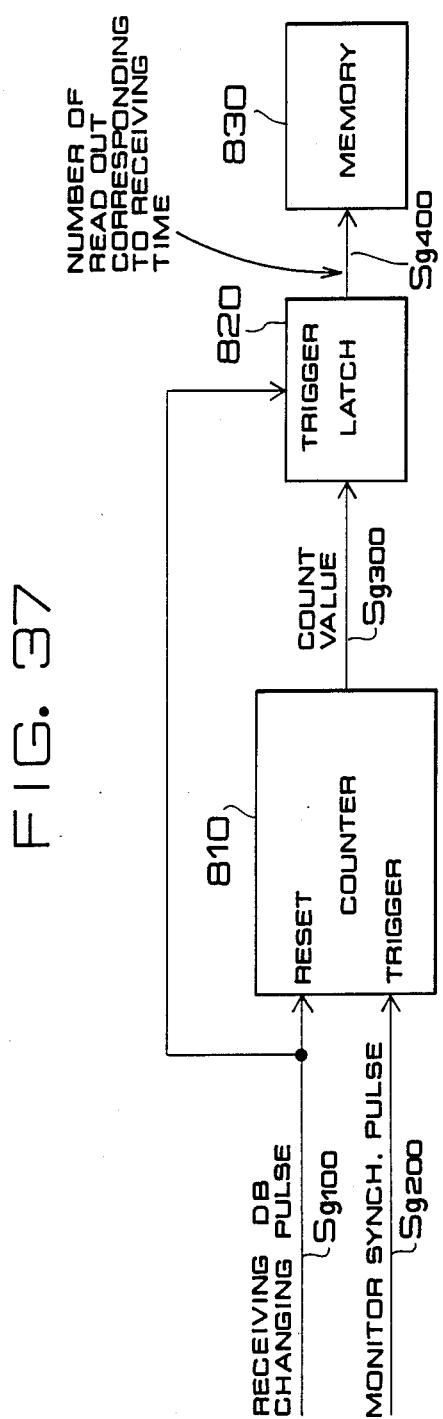

VIDEO ENCODING APPARATUS

BACKGROUND OF THE INVENTION

1. Field of the Invention

The present invention relates to a video encoding apparatus which is applied, for example, to a video communication system.

2. Description of the Prior Art

FIG. 1 shows an example of such apparatus in the prior art, particularly a video encoding apparatus of the movement compensation type. In FIG. 1, numeral 1 designates an A/D converter which receives video signals outputted from a video camera 8 and converts the signals in analog/digital conversion and then outputs them. A block constituting member 2 receives the digital signal series outputted from the A/D converter 1 and makes every K picture elements close on the picture image (K: integer not less than 2) in a block and outputs the signals in the block. A frame memory 3 stores data transmitted one frame before the existing input signal frame and supplied through an adder 10. A reference signal generator 4 reads from the frame memory 3 the input block including the existing input signal series constituted into a block in the block constituting member 2 and also plural blocks including the block at the same position on the picture image and formed by the signal series which is one frame before the existing frame. A distortion operation member 5 operates distortion between the signal series of the input block outputted from the block constituting member 2 and the signal series of the plural blocks stored in the frame memory 3, and outputs the position information of the block giving the minimum distortion and the existing signal series. A subtractor 6 estimates difference signal series (vector) between the signal series of the input block outputted from the block constituting member 2 and the signal series of the block giving the minimum distortion and outputted from the distortion operation member 5, and then outputs the difference signal. A quantization encoding member 7 receives the difference signal series (vector) outputted from the subtractor 6 and performs quantization encoding of the difference signal. A quantization decoding member 9 reproduces the difference signal series from the quantization encoding signal outputted by the quantization encoding member 7. An adder 10 adds the quantization decoding output from the quantization decoding member 9 to the signal series of the block giving the minimum distortion and outputted from the distortion operation member 5, and reproduces the video signal and writes it to the frame memory 3.

The principle of the vector quantization will now be briefly described referring to FIG. 2.

The information source input signal series of K in number are brought together into input vector $x = \{x_1, x_2, \ldots, x_K\}$. Then, the K-dimensional Euclidean signal space $R^K (x \in R^K)$ has the representative points of N in number (i.e., output vector) $y_i = \{Y_{i1}, Y_{i2}, \ldots, Y_{iK}\}$, and set of the representative points is made $Y = \{y_1, y_2, \ldots, y_N\}$. If each partition of $R^K$ having output vector $y_i$ as the representative point (e.g., center of gravity) is made $R_1, R_2, \ldots, R_N$, vector quantization Q is defined by the following formula:

$$Q: R^K \to Y \quad (1)$$

wherein $$R_i = Q^{-1}(y_i) = \{x \in R^K : Q(x) = y_i\} \quad (2)$$

$$\bigcup_{i=1}^{N} R_i = R^K, \quad R_i \cap R_j = \phi (i \neq j) \quad (3)$$

The vector quantization Q is expressed as a cascade connection of encoding C and decoding D. The encoding C is a mapping of the output vector set $Y = \{y_1, y_2, \ldots, y_N\}$ of $R^K$ to index set $I = \{1, 2, \ldots, N\}$, and the decoding D is a mapping from I to Y. That is, $$C: R^K \to I, \quad D: I \to Y \quad (4)$$

$$Q = D \cdot C \quad (5)$$

Since the encoding output I is transmitted or recorded in the vector quantization, the encoding efficiency is quite good.

The vector quantization is the mapping of the input vector to the output vector $y_i$ in the minimum distance (minimum distortion). More specifically, if distance (distortion) between input/output vector is made $d(x, y_i)$, it follows that $$\text{if } d(x, y_i) < d(x, y_j) \text{ for all } j \quad (6)$$

$$x \in R_i \text{ hence } x \to y_i \quad (7)$$

Set Y of the output vector $y_i$ as shown in FIGS. 3(A) and 3(B) can be determined by clustering using the information source input signal series being the training model (repetition of selection of the representative points and the partition of signal space until the total distortion becomes minimum).

Operation of the apparatus in above-mentioned constitution of FIG. 1 will be described. Video signals outputted from the video camera 8 to the A/D converter 1 are converted into digital signal series by the A/D converter 1 and then outputted to the block constituting member 2. In the block constituting member 2, every K picture elements close on the picture image are made a block usually in rectangular form (or square form) on the picture image, and transformed in the arrangement and then outputted to the distortion operation member 5 and the subtractor 6. On the other hand, the signal series of the plural blocks, which are stored in the memory 3 and read by the reference signal generator 4, are transmitted to the distortion operation member 5 in synchronization with the existing input signal series outputted from the block constituting member 2 by the reference signal generator 4. An example of the position relation between the block of the existing input signal series outputted from the block constituting member 2 and the plural blocks read by the reference signal generator 4 is shown in FIG. 3(A) illustrating the existing frame and FIG. 3(B) illustrating the frame being one before the existing frame. The distortion calculation between the signal series of the existing input block and the signal series of the plural blocks is performed in the distortion operation member 5 using, for example, Euclidean distortion or absolute value distortion. According to the calculation results, the block to provide the minimum distortion to the existing input block is selected among the plural blocks. Assuming that the blocks as the calculation object are M in number (M: integer not less than 2) and the block to provide the minimum distortion is the l-th one among the M blocks (l=1, 2, ..., M), the distortion operation member 5 outputs the value of l and the signal series of the block to the subtractor 6. The subtractor 6 estimates the difference signal series (vector) between the signal series of the input block and the signal series to give the minimum distortion and outputs the difference signal series to the quantization encoding member 7. The difference signal series (vector) is subjected to the quantization encoding in the quantization encoding member 7 and then outputted to the quantization decoding member 9. Both the difference signal series reproduced by the quantization decoding member 9 and the signal series of the block outputted from the distortion operation member 5 and giving the minimum distortion are outputted to the adder 10 and added by the adder 10 and reproduced in the video signal. The video signal is written in the frame memory 3 by the adder 10. The signal processing in the process from the quantization encoding member 7 up to the adder 10 in effect relates to the subsequent processing by vector of the difference signal series estimated in the subtractor 6. The smaller the amount of the difference signal, i.e., the vector quantity, the higher the efficiency of the movement compensation.

In the manner as described above, the inputted video signal is formed as a block which is used to select the block most resembling those in the former frame. The newest block is compared to the selected block, the difference or error component being quantized to form a coded output signal, together with information representing which block is the most resembling one.

The video encoding apparatus in the prior art, particularly the video encoding apparatus of the movement compensation type is constituted as above described. For example, even in the movement such as the oscillating motion of the video camera 8 where the moving direction of the screen is clear, the efficiency of the movement compensation cannot be increased in the prior art, because the position relation between the block as object of the distortion operation stored in the frame memory 3 and the input block outputted from the block constituting member 2 is fixed.

SUMMARY OF THE INVENTION

A first object of the invention is to provide a video encoding apparatus wherein if the moving direction of a picture screen is clear the information regarding the moving direction is reflected upon the movement compensation; thereby efficiency of the movement compensation can be improved.

A second object of the invention is to provide a video encoding apparatus wherein, even if signals from a plurality of cameras not synchronously coupled are suitably changed and inputted, the irregularity of the picture image can be suppressed and made minimum.

A third object of the invention is to provide a video encoding apparatus wherein the irregularity of the picture image can be suppressed and made minimum and moreover the original picture image can be restored rapidly.

A fourth object of the invention is to provide a video encoding apparatus wherein occurrence of excessive information can be suppressed when a block with high approximation exists as a result of the distortion operation, and storage of the quantization error can be suppressed to the block with high approximation.

A fifth object of the invention is to provide a video encoding apparatus wherein when video signals with high occurrence frequency of significant blocks even using a plurality of reference blocks are inputted the information amount is not increased.

A sixth object of the invention is to provide a vector quantization encoder wherein the encoding efficiency can be significantly improved.

A seventh object of the invention is to provide a vector quantization encoder wherein memory contents to constitute the output vector code table of respective stages can be made common.

A eighth object of the invention is to provide a vector quantization encoder between frames wherein noise of block form in the video signals can be decreased and band compression of the video signals at high quality is possible.

A ninth object of the invention is to provide a motion picture image transmission apparatus wherein coma elimination can be performed adaptably depending on condition of the transmission path without impairing the transmission efficiency, and the picture image of coma elimination can be reproduced as a smooth image.

The first object can be achieved in that a video camera is provided with a moving direction detecting means for detecting the movement of the video camera in the present moving direction and outputting the detecting signal, a moving information generating member is installed for operating the displacement amount of the video camera on the basis of the detecting signal outputted from the moving direction detecting means and estimating the specific position on the frame memory corresponding to the operated displacement amount of the video camera and outputting the specific position to the reference signal generating member, and a plurality of blocks stored in the specific position on the frame memory are read on the basis of output from the moving information generating member.

The second object can be achieved in that a fluctuation detecting means is installed for detecting the time fluctuation of synchronous signals included in the inputted video signals, and action of a quantization encoder is stopped during the fluctuation detecting on the basis of output of the fluctuation detecting means.

The third object is achieved in that a fluctuation detecting means is installed for detecting the time fluctuation of synchronous signals included in the inputted video signals, a signal changing means is installed for changing the input to a quantization encoder from a difference signal between frames into an input video signal on the basis of output of the fluctuation detecting means, action of the quantization encoder is stopped during the fluctuation detecting on the basis of output of the fluctuation detecting means, and the signal changing means performs the changing from the input video signal into the difference signal between frames by providing delay of one frame of the input video signal after the fluctuation cannot be detected.

The fourth object is achieved in that a distortion operation means is installed for operating distortion between signal series of an input block in the last video signal inputted through means for making a block and signal series of plural blocks read from a video signal storing means by a reading means corresponding to the input block and outputting the minimum distortion and the position information and the signal series of the block to provide the minimum distortion, a comparison means is installed for comparing the minimum distortion value with the prescribed threshold value, a quantization encoding means is installed for performing quantization encoding of difference signal series between the signal series of the input block and the signal series of the block to provide the minimum distortion, a writing means is installed for adding the difference signal series reproduced from the quantization encoding output through a quantization decoding means to the signal series of the block to provide the minimum distortion on the basis of the comparison result of the comparison means when the minimum distortion value is larger than the prescribed threshold value and writing the added signal series to a video signal storing means, and an encoding control means is installed for performing variable length encoding of the position information of the block to provide the minimum distortion and the quantization encoding output when the minimum distortion value is larger than the prescribed threshold value and outputting the variable length encoding signal to the transmission path.

The fifth object is achieved in that a first operation means is installed for estimating difference signal series between signal series of an input block in the last video signal inputted through means for making a block and signal series of plural blocks read from a video signal storing means by a reading means corresponding to the input block, a second operation means is installed for estimating the mean value and deviation component of the difference signal series per each block, a discrimination means is installed for discriminating the most approximate value to the input block on the basis of the mean value and the deviation component of the difference signal series of each block and outputting the position information and also comparing the mean value and the deviation component with the prescribed threshold value and discriminating whether the input block is significant or not and outputting the significance/insignificance information, a quantization encoding means is installed for performing the quantization encoding of the difference signal series corresponding to the same position block from the first operation block, a quantization decoding means is installed for decoding the quantization encoding output, a video signal reproduction means is installed wherein if the information is significant the signal series by adding the difference signal series decoded by the quantization decoding means to the signal series of the same position block read by the reading means is written to a video signal storing means and if the information is insignificant the signal series of the most approximate block read by the reading means on the basis of the position information is written thereto, and an encoding control means is installed for inputting the quantization encoding output and the position information and the significance/insignificance information and performing the variable length encoding of each information except the position information if the significance/insignificance information is significant and except the quantization encoding output if it is insignificant and outputting the variable length encoding signal to the transmission path.

The sixth object is achieved in that encoders are installed for calculating distortion between each output vector index stored in a vector code table and input signal vector and estimating the output vector index to minimize the distortion, initial pseudo output vector index is inputted to the encoder of the initial stage among various encoders so that code "0" of the required number is added to upper side of the output vector index having shorter code length among the output vector indexes of the encoding stages and indexes of the pseudo output vector with equalized code length are not overlapped to each other, and a pair of output vectors corresponding to the pseudo output vector index and the initial pseudo output vector index are constituted in equalizing at the vector code table of the encoder in each stage.

The eighth object is achieved in that input video signal series and video signal series being one frame period before the input video signal series are made the prediction signal series and the difference between both signal series is taken, the difference signal is compared with the threshold value set by a feedback control signal from a transmission buffer and discrimination of significance/insignificance is performed, only the significant picture element is made a block and normalized vector quantization encoding with means value separation is performed and also variable length encoding is performed to the block, and the encoded output signal is outputted through a transmission buffer to the transmission path.

The ninth object is achieved in that an input buffer control means controls read/write of an input buffer and the changing thereof on the basis of a synchronizing signal of a camera and a changing signal of a transmission buffer and updates video data from the camera per frame and writes the data and changes the read/write from the next frame after changing the transmission buffer, and in that an output buffer control means controls the operation of an output buffer in accordance with a synchronizing signal of a monitor and a changing signal from the input buffer and causing the number of reading for the same frame in the output buffer to be in corresponding with the writing time for the former frame in the receiving buffer.

BRIEF DESCRIPTION OF THE INVENTION

FIG. 1 is a diagram illustrating the whole constitution of a video encoding apparatus in the prior art;

FIG. 2 is a diagram illustrating the general principle of vector quantization;

Figure 3A:
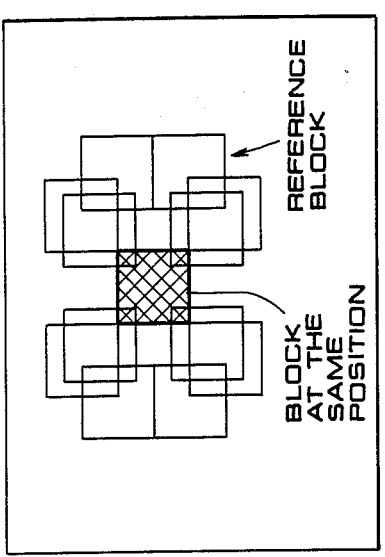
Figure 3B:
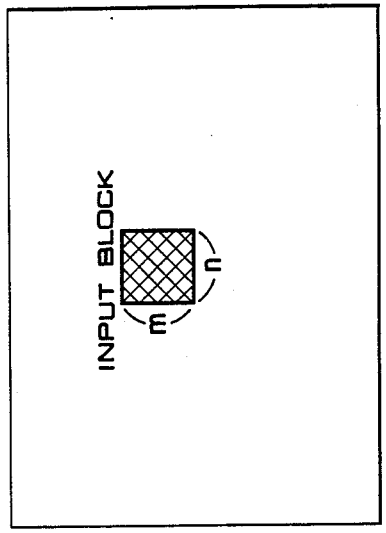
Figure 4:
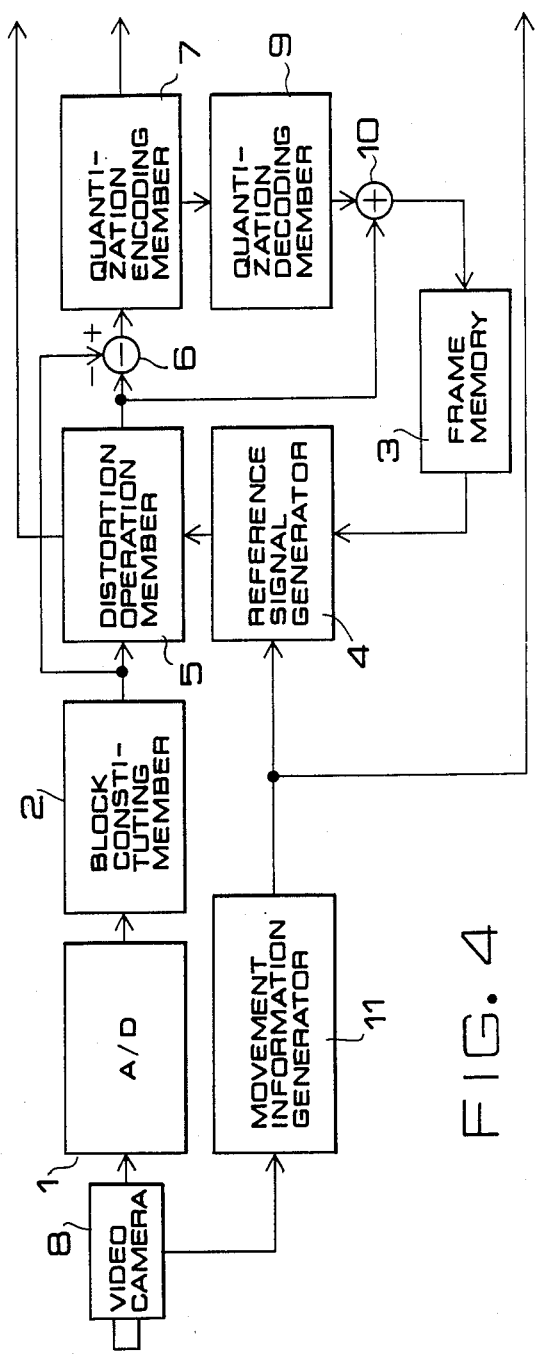
Figure 5:
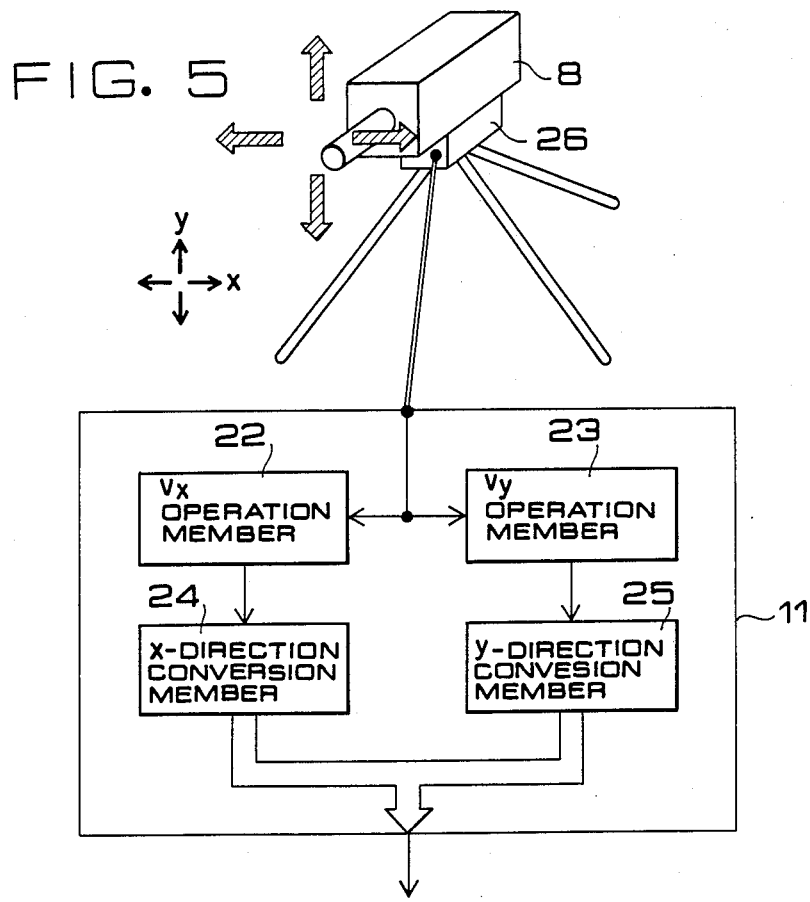
Figure 6:
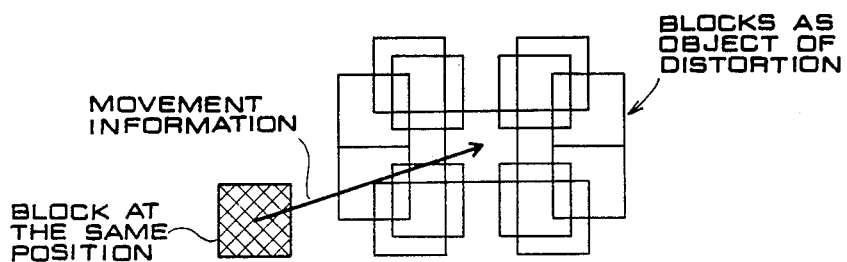
Figure 7:
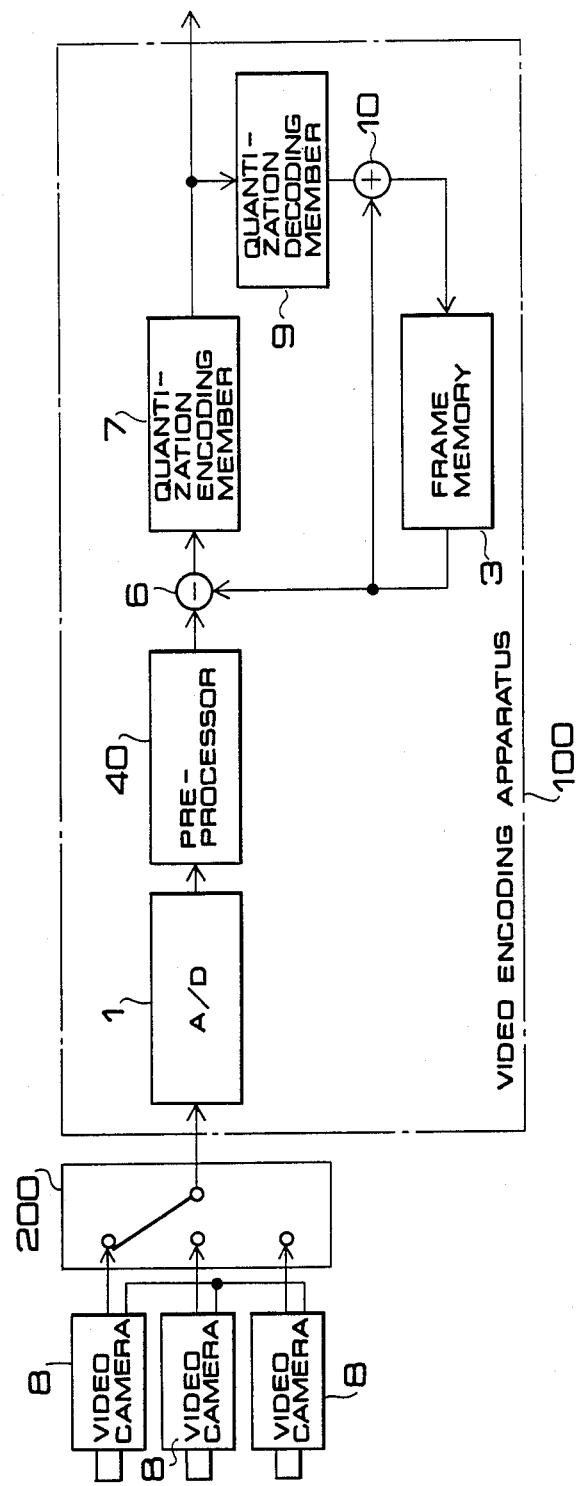
Figure 8:
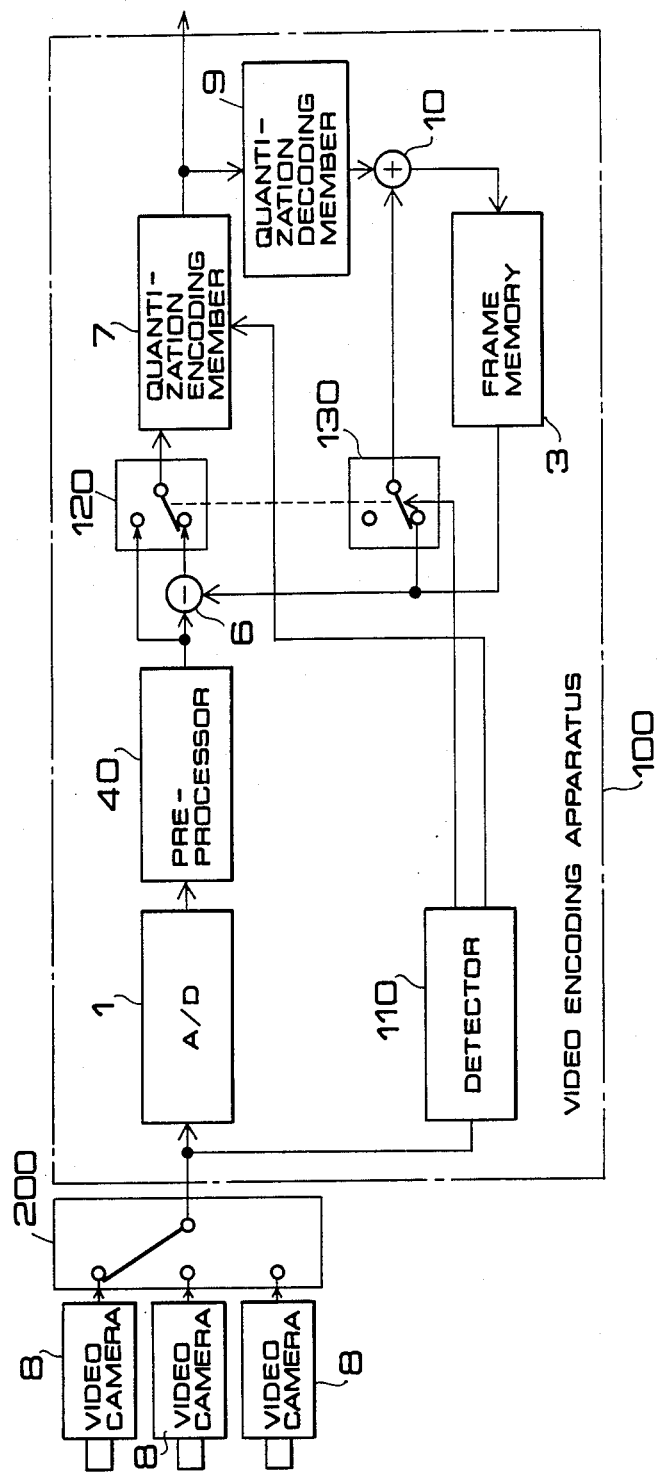
Figure 9:
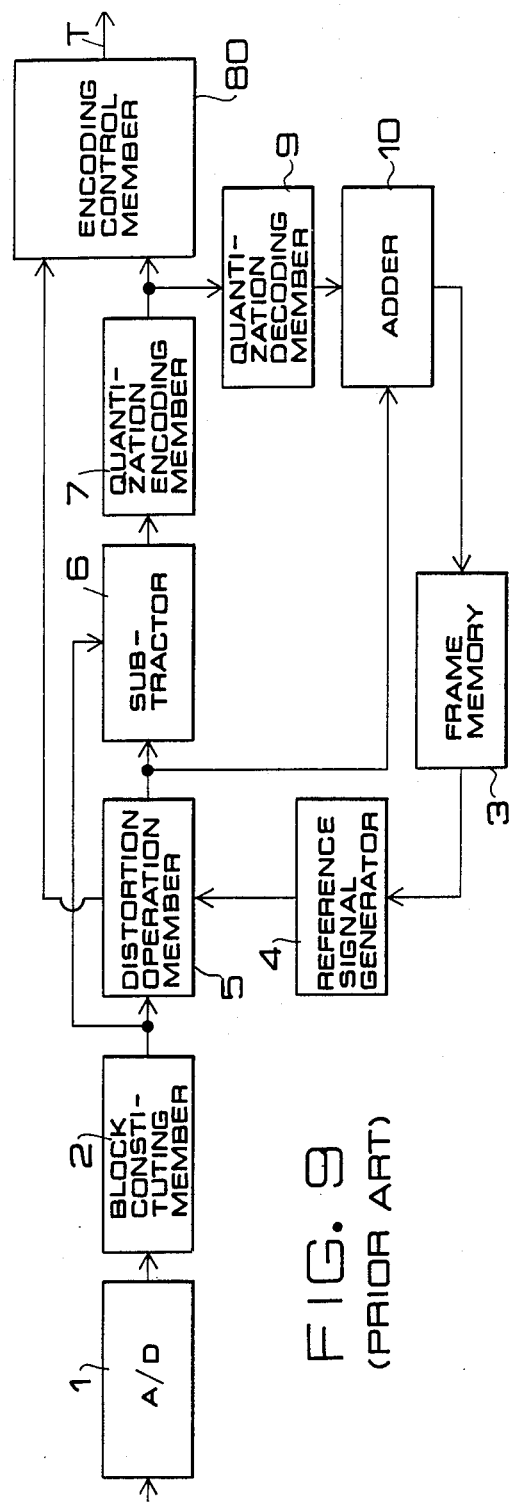
Figure 10B:
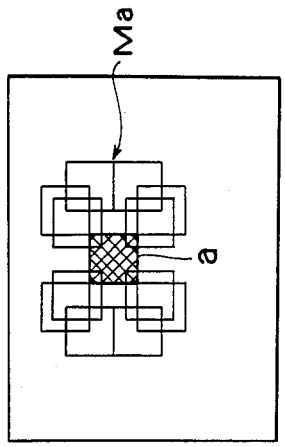
Figure 10A:
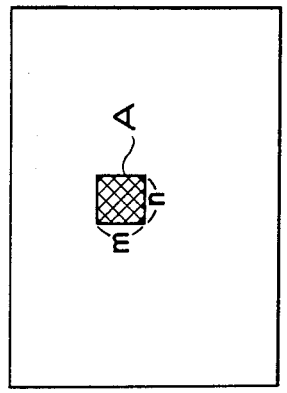
Figure 11:
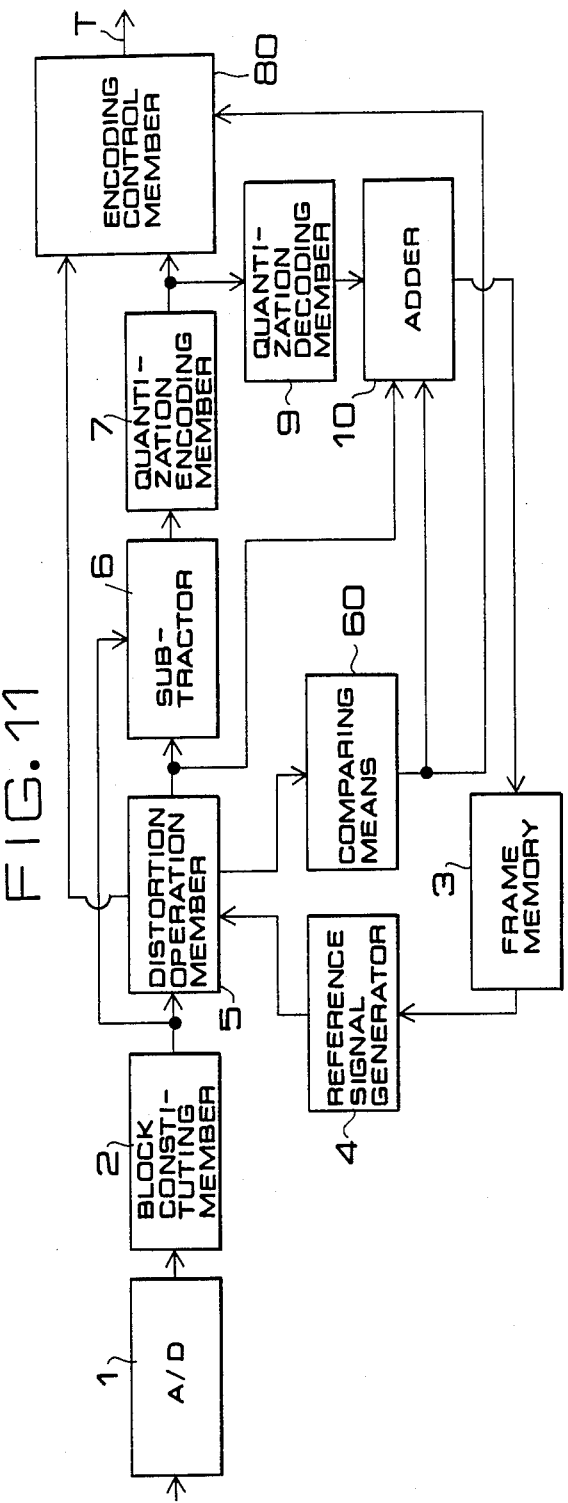
Figure 12B:
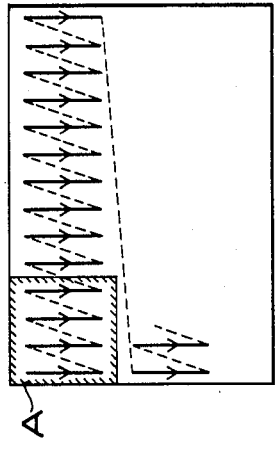
Figure 12A:
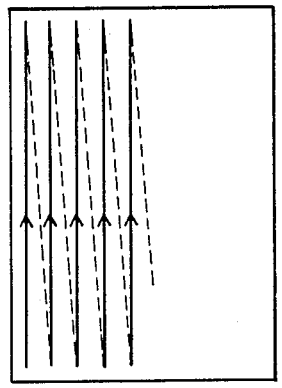
Figure 16:
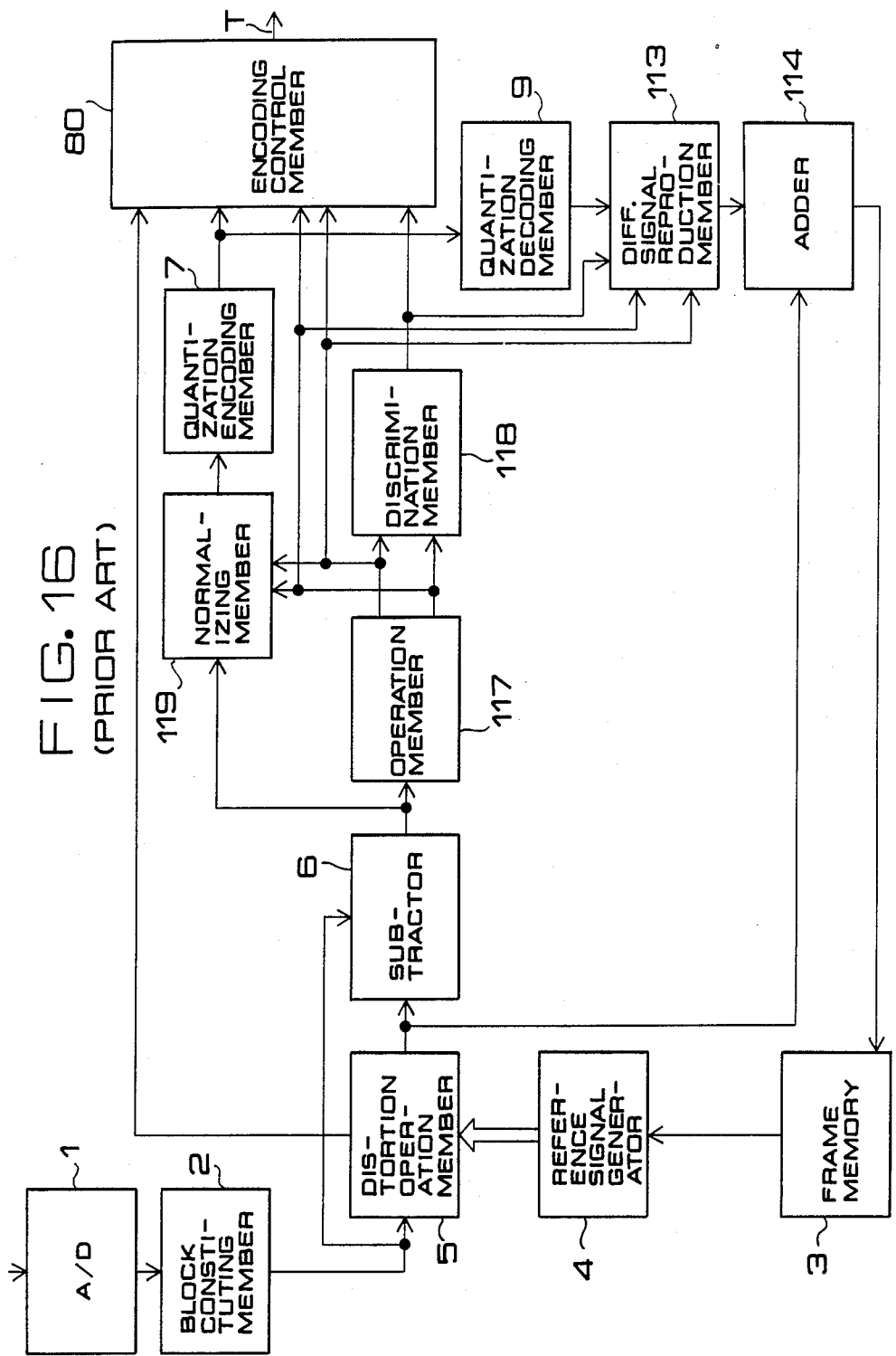
Figure 18:
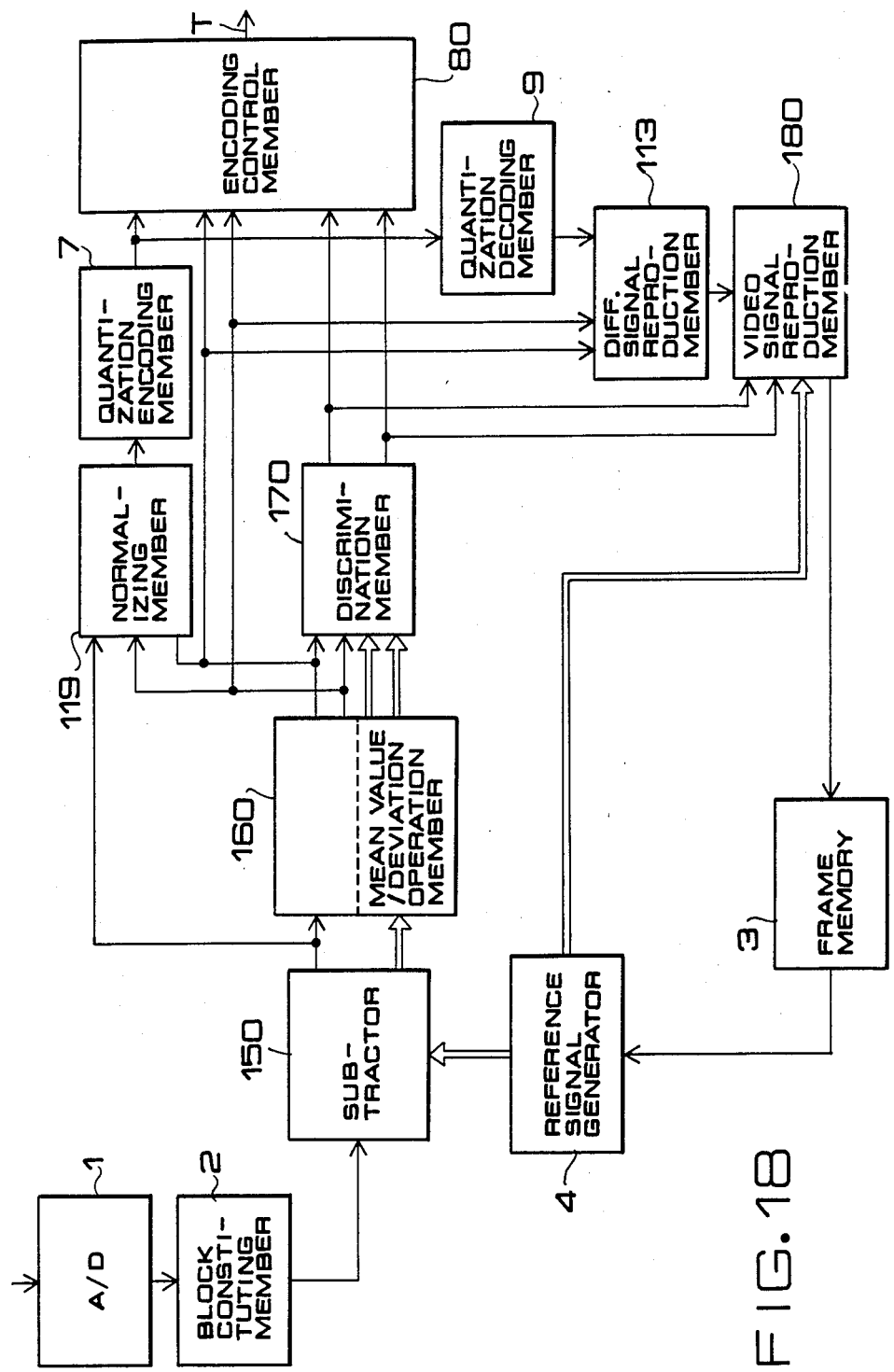
Figure 19A:
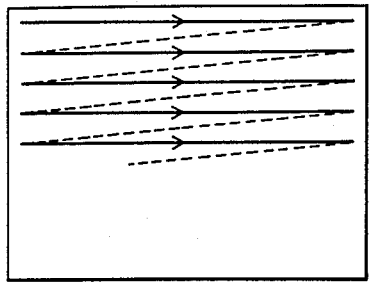
Figure 19B:
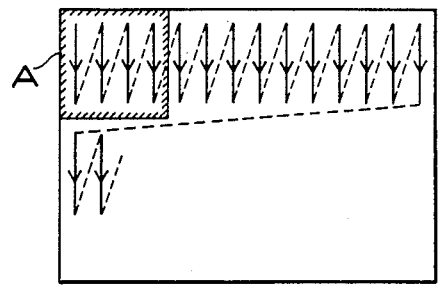
Figure 20:
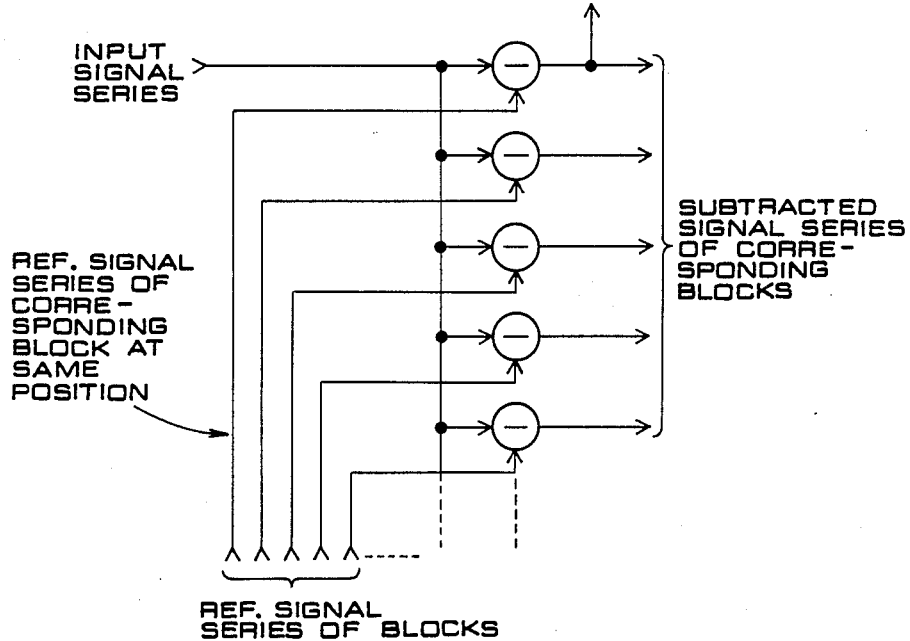
Figures 21, 22:
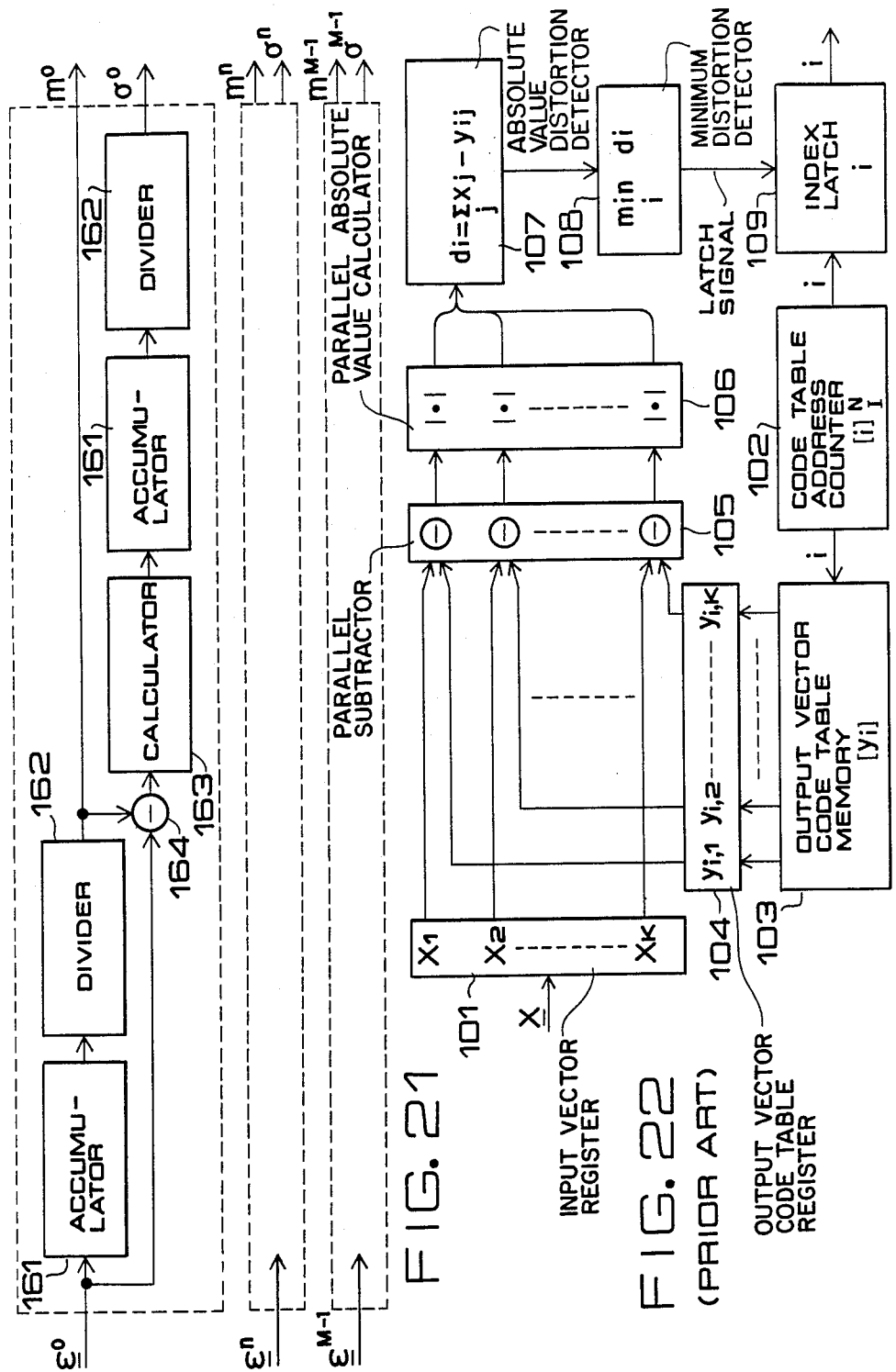
Figure 27:
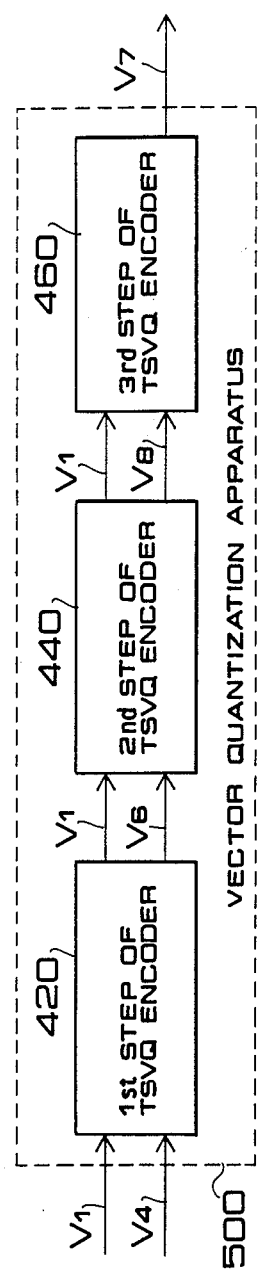
Figure 28:
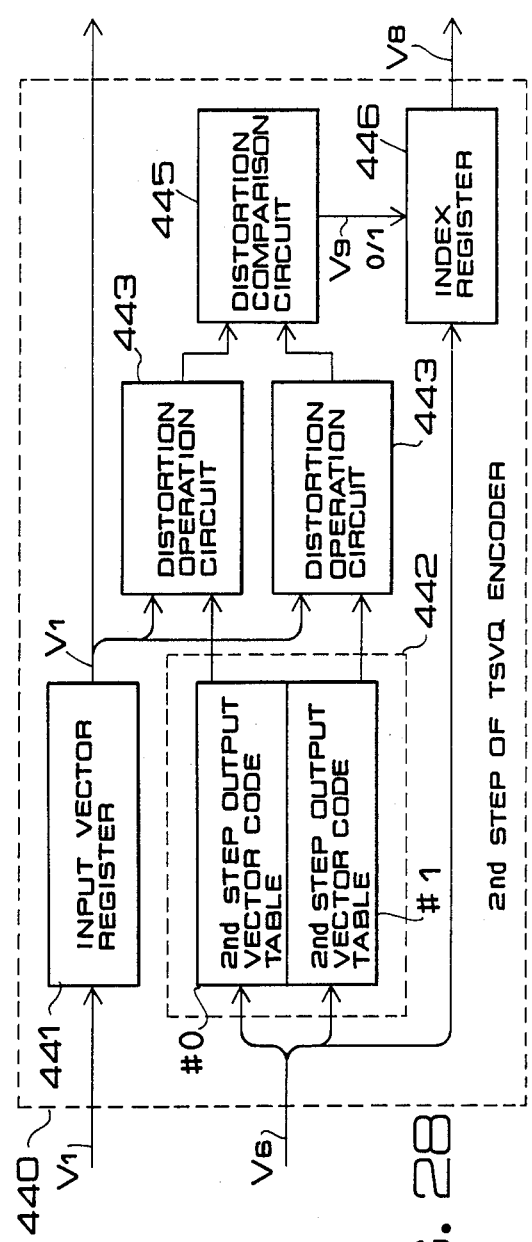
Figure 33:
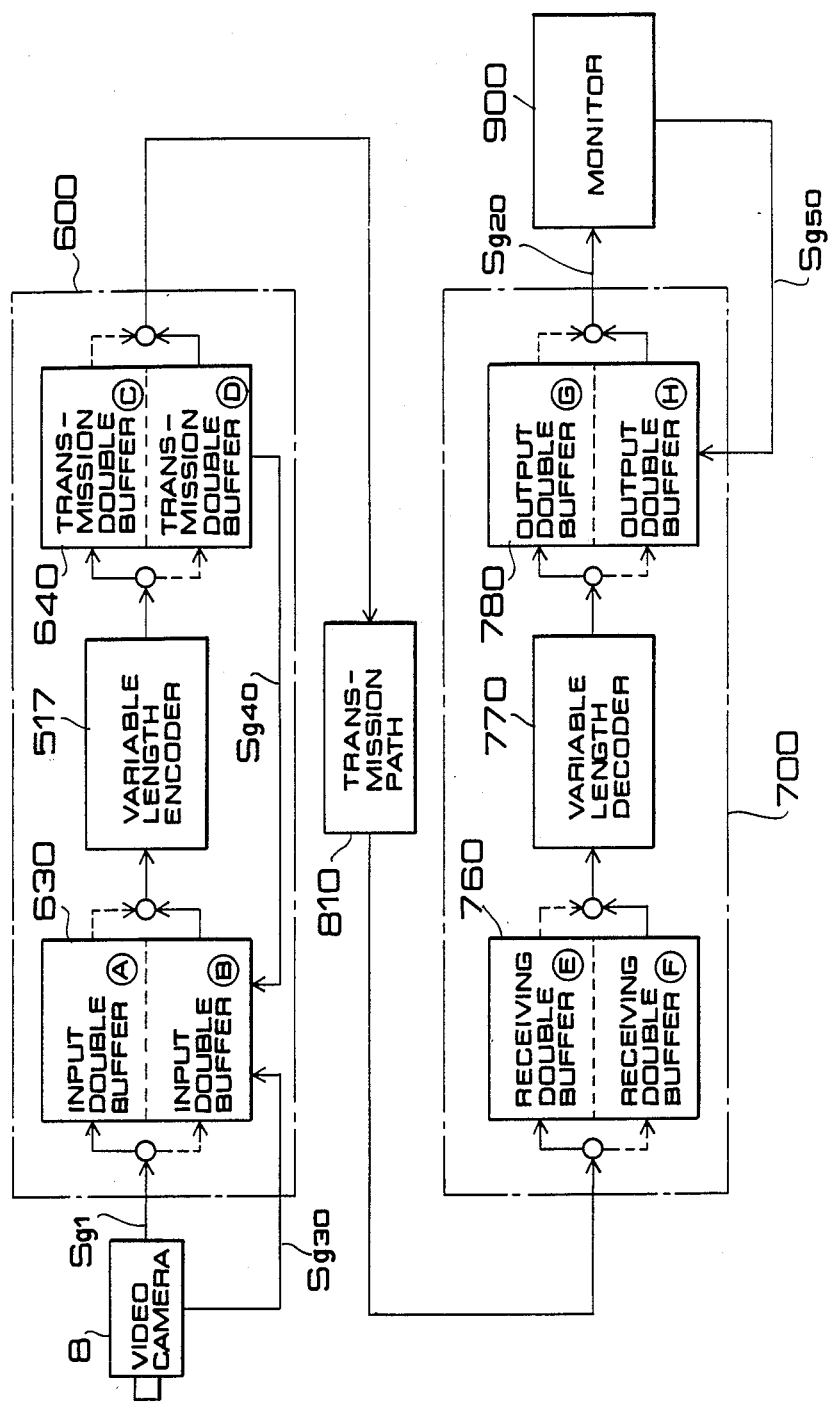
Figure 34:
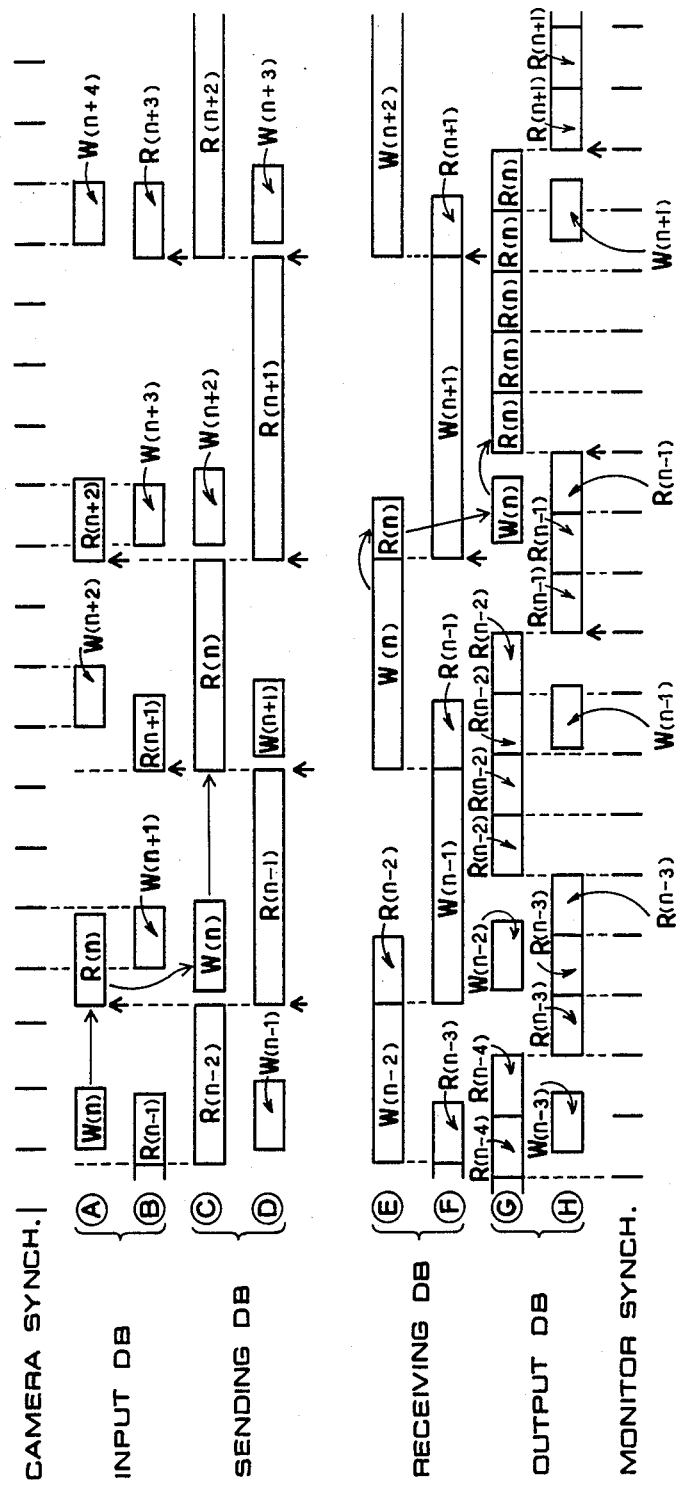

FIGS. 3(A) and 3(B) illustrate the position relation between an input block in a video encoding apparatus and plural blocks as objects of distortion operation in the prior art;

FIG. 4 is a diagram illustrating the whole constitution of a video encoding apparatus as a first embodiment of the invention;

FIG. 5 is a diagram illustrating the main part of the video encoding apparatus of a first embodiment of the invention;

FIG. 6 is a diagram illustrating an example of position relation between an input block controlled adaptably and plural blocks as objects of distortion operation in the first embodiment;

FIG. 7 is a diagram illustrating the constitution of a video encoding apparatus as background art of a second embodiment of the invention;

FIG. 8 is a diagram illustrating the constitution of a video encoding apparatus in a second embodiment;

FIG. 9 is a diagram illustrating constitution of a video encoding apparatus as background art of a third embodiment of the invention;

FIGS. 10(A) and 10(B) illustrate the position relation between an input block on a picture image and plural read blocks;

FIG. 11 is a block diagram illustrating the constitution of a video encoding apparatus of the movement compensation type in the third embodiment;

FIGS. 12(A) and 12(B) illustrate the procedure of block formation of input signal series in the third embodiment;

FIG. 13 is a detailed constitution diagram of a distortion operation member in the third embodiment;

FIG. 14 is a detailed constitution diagram of a quantization encoding member in the third embodiment;

FIG. 15 is a diagram illustrating an example of variable length encoding control in the third embodiment;

FIG. 16 is a block diagram of a video encoding apparatus of the movement compensation type as background art of a fourth embodiment of the invention;

FIGS. 17(A) and 17(B) illustrate the position relation between an input block and plural read blocks in FIG. 16;

FIG. 18 is a block diagram of a video encoding apparatus of the movement compensation type in the fourth embodiment;

FIGS. 19(A) and 19(B) show the operation of a block constitution member in the fourth embodiment;

FIG. 20 is a constitution diagram of a subtraction member in the fourth embodiment;

FIG. 21 is a constitution diagram of a mean/deviation operation member in the fourth embodiment;

FIG. 22 is a block diagram illustrating constitution of a vector quantization encoder as background art of a fifth embodiment of the invention;

FIG. 23 is a block diagram illustrating the constitution of the fifth embodiment;

FIG. 24 is a block diagram illustrating the detailed constitution of the main elements in the fifth embodiment;

FIG. 25 is a constitution diagram illustrating an example of a tree search vector quantization encoder as background art of a sixth embodiment of the invention;

FIG. 26 is a constitution diagram illustrating an example of the second stage of a tree search vector quantization encoder as background art of the sixth embodiment;

FIG. 27 is a constitution diagram of a tree search vector quantization encoder in the sixth embodiment;

FIG. 28 is a constitution diagram illustrating an example of the second stage of a tree search vector quantization encoder in the sixth embodiment;

FIG. 29 is a diagram illustrating address map of output vector code tables #0, #1 in the sixth embodiment;

FIG. 30 is a diagram illustrating a search in the tree search vector quantization in the sixth embodiment;

FIG. 31 is a block diagram of a vector quantization encoder between frames as background art of a seventh embodiment of the invention;

FIG. 32 is a block diagram of a vector quantization encoder between frames in the seventh embodiment;

FIG. 33 is a block diagram of a motion picture image transmission apparatus as background art of an eighth embodiment of the invention;

FIG. 34 is a timing chart of the apparatus in FIG. 33;

FIG. 35 is a block diagram of a motion picture image transmission apparatus in the eighth embodiment;

FIG. 36 is a timing chart in the eighth embodiment; and

FIG. 37 is a diagram illustrating a circuit for storing the receiving time of frames in the apparatus shown in FIG. 35.

DESCRIPTION OF THE PREFERRED EMBODIMENTS

Embodiments of the invention will now be described. Before specific description of individual embodiments, an outline of the embodiment will be generally described and then the constitution and operation will be described.

In the embodiments, when a moving direction detecting means outputs a detecting signal, a movement information generator estimates the specific position on a frame memory correspond to displacement amount of a video camera calculated on the basis of the detecting signal and outputs the specific position to a reference signal generator. The reference signal generator reads plural blocks stored to the specific position on the frame memory on the basis of the output from the movement information generator.

First Embodiment:

An embodiment of the invention will be described specifically referring to the accompanying drawings.

In FIG. 4, parts designated by numerals 1-3, 5-10 are similar to those in FIG. 1, and the detailed description will be omitted. The video camera 8 is provided with an angle sensor 26 which detects and outputs angular velocity in the oscillating motion when the video camera 8 performs the oscillating motion only with respect to the x-axis direction and the y-axis direction shown in FIG. 5.

Numeral 11 designates a movement information generator, and input side of the movement information generator 11 is connected to the angle sensor 26 installed to the video camera 8 and output side thereof is connected to the reference signal generator 4. As shown in FIG. 5, the movement information generator 11 is composed of $v_x$ operation member 22 and $v_y$ operation member 23 which are connected at the input side to the output side of the angle sensor 26, and of x-direction conversion member 24 and y-direction conversion member 25 which are connected at the output side to the input side of the reference signal generator 4. The $v_x$ operation member 22 calculates the oscillating speed of the video camera 8 in the x-direction shown in FIG. 5 on the basis of an output signal from the angle sensor 26 and outputs the operation result. The $v_y$ operation member 23 calculates the oscillating speed of the video camera 8 in the y-direction shown in FIG. 5 on the basis of an output signal from the angle sensor 26 and outputs the operation result. The x-direction conversion member 24 reads the operation data outputted from the $v_x$ operation member 22 and converts it into initial deviation of picture element level in the x-direction and outputs the converted data as movement information of the picture screen in the x-direction. The y-direction conversion member 25 reads the operation data outputted from the $v_y$ operation member 23 and converts it into initial deviation of picture element level in the y-direction and outputs the converted data as movement information of the picture screen in the y-direction. The reference signal generator 4 takes the movement information and estimates the displacement amount of the video camera 8 per one frame, and retrieves a block corresponding to the existing input block among plural blocks formed by signal series being one frame before the existing frame by shifting on the frame memory 3 by an amount corresponding to the displacement amount of the video camera 8 and outputs the retrieved block. FIG. 6 shows position relation between the controlled input block and plural blocks as objects of distortion operation.

Operation in the above-mentioned constitution will be described.

Video signals outputted from the video camera 8 to the A/D converter 1 are converted into digital signal series by the A/D converter 1 and then outputted to the block constituting member 2. In the block constituting member 2, every K picture elements close on the picture image are made a block usually in rectangular form (or square form) on the picture image, and transformed in the arrangement and then outputted to the distortion operation member 5 and the subtractor 6. On the other hand, the signal series of the plural blocks, which are stored in the memory 3 and read by the reference sigal generator 4, are transmitted by the reference signal generator 4 to the distortion operation member 5 in synchronization with the existing input signal series in a block outputted from the block constituting member 2.

The distortion calculation between the signal series of the existing block and the signal series of the plural blocks being one frame before the existing frame is performed in the distortion operation member 5 using, for example, Euclidean distortion or absolute distortion. According to the calculation results, the block to provide the minimum distortion to the existing input block is selected among the plural blocks. Assuming that the blocks as the calculation object are M in number (M: integer not less than 2) and the block to provide the minimum distortion is the l-th one among the M blocks (l=1, 2, ..., M), the distortion operation member 5 outputs the value of l and the signal series of the block to the subtractor 6. The subtractor 6 estimates the difference signal series between the signal series of the input block and the signal series to give the minimum distortion and outputs the difference signal series to the quantization encoding member 7. The difference signal series is subjected to quantization encoding in the quantization encoding member 7 and then outputted to the quantization decoding member 9. Both the difference signal series reproduced by the quantization decoding member 9 and the signal series of the block outputted from the distortion operation member 5 and giving the minimum distortion are outputted to the adder 10 and added by the adder 10 and reproduced in the video signal. The video signal is written in the frame memory 3 by the adder 10. The video signal inputted as above described is made a block.

In the manner as described above, the inputted video signal is formed as a block which is used to select the block of most resembling those in the former frame. The newest block is compared to the selected block, the difference or error component being quantized to form a coded output signal, together with information representing which block is the most resembling one.

If the angle sensor 26 detects the oscillating motion of the video camera 8 with respect to the x-direction and/or the y-direction shown in FIG. 5 and the detecting signal is inputted from the sensor 26 to the $v_x$ operation member 22 and the $v_y$ operation member 23, the $v_x$ operation member 22 and the $v_x$ operation member 23 calculate the oscillating speed in respective directions based on above-mentioned data and output the oscillating speed to the x-direction conversion member 24 and the y-direction conversion member 25. Thereby the x-direction conversion member 24 and the y-direction conversion member 25 perform conversion to the initial deviation of the picture element level in the x-direction and the y-direction respectively, and output the converted data as the movement information of the picture screen in the x-direction and the y-direction respectively. If the movement information of the picture screen is inputted in the x-direction and the y-direction, the reference signal generator 4 operates the displacement amount of the video camera 8 per one frame as the vector quantity having the x-direction component and the y-direction component. Based on the operation results, the reference signal generator 4 retrieves a block corresponding to the existing input block among the plural blocks which are stored in the frame memory 3 and formed by the signal series being one frame before the existing frame by shifting on the frame memory 3 as shown in FIG. 4. Thus absolute value of the block retrieved in the reference signal generator 4, i.e. the block to give the minimum distortion on the frame memory 3 is represented by the movement information of the picture screen and the value of l.

According to the embodiment as above described, since the block to give the minimum distortion is selected among the block group selected adaptably on the basis of the movement information of the picture screen, the approximation between the input block and the block to give the minimum distortion becomes high and the difference signal is apt to concentrate to a smaller value. Thereby the information amount generated in the quantization encoding member 7 is considerably reduced. Although the increase of the information amount by outputting the movement information of the picture screen must be considered in this case, the movement information outputted from the angle sensor 26 installed to the video camera 8 has the taking frequency of order of, for example, once per several frames of the picture image or once per second and therefore the converted information amount per one picture screen becomes small. Accordingly, the information reduction amount of the quantization encoding output appears almost entirely as the information compression effect.

Second Emobodiment:

A second embodiment of the invention will now be described. Before describing the second embodiment, background art as the basis of the second embodiment will be described.

FIG. 7 shows a video encoding apparatus in background art. In FIG. 7, numeral 8 designates a plurality of cameras for inputting picture images, and numeral 200 designates a changing device for changing the plural video signals. Numeral 100 designates a video encoding apparatus comprising an A/D converter 1 for converting the inputted video signals in A/D conversion, a pre-processor 40 for performing pre-processing to encode the video signals in digital form, a frame memory 3 for storing the video signal being one frame before the existing frame, a subtractor 6 for estimating the difference between the output of the pre-processor 40 and the output of the frame memory 3, a quantization encoding member 7 for performing quantization encoding of the difference signal between frames, a quantization decoding member 9 for performing the reverse processing to the quantization encoding member 7, and an adder 10.

Among the video signals outputted from the plural cameras 8, only one is selected by the selecting device 200 and outputted. If the output signal is inputted to the video encoding apparatus 100, the signal is converted in the A/D conversion by the A/D converter 1 and processed in the pre-processor for encoding by the pre-processor 40 and then inputted to the subtractor 6 so as to estimate the difference signal between frames. The difference signal between frames is subjected to the quantization encoding in the quantization encoding member 7, and then outputted to the outside and also subjected to the quantization decoding in the quantization decoding member 9. For processing of the next frame. the decoded signal is added through the adder 10 to output of the frame memory 3 and then stored in the frame memory 3.

An example of a practical use of the video encoding apparatus is a teleconferencing system or the like. In the teleconferencing system, a plurality of cameras are often used and signals are suitably changed. Studying the operation when the changing device 200 is changed, output video signals of the changing device 200 become discontinuous just after the changing and synchronizing signal or the like may be significantly fluctuated. As a result, the prior art has problems in that the insignificant difference signal between frames is encoded until synchronized drawing finishing and the encoding picture image is fluctuated. In order to eliminate the fluctuation of the synchronous signal, the plural cameras 8 may be synchronously coupled. However, the synchronous coupling of cameras is usually possible only in expensive cameras.

An outline of the second embodiment will be described.

In the second embodiment, a fluctuation detecting means detects fluctuation of the synchronous signal due to changing of input video signals and stops operation of a quantization encoding member so as to prevent the fluctuation of the picture image due to encoding of the significant difference signal between frames.

The second embodiment will be described specifically.

In FIG. 8, parts similar to those in FIG. 7 are designated by the same reference numerals. Numeral 7 designates a quantization encoding member which can be ON/OFF controlled by external signals, numeral 9 a quantization decoding member which performs the reverse processing to the quantization encoding member 7, numeral 110 a detector which separates the synchronous signal from the inputted video signals and detects the time variation and controls the quantization encoding member 7 and changing means as hereinafter described, numeral 120 a changing device which changes the output of the pre-processor 40 and the output of the subtractor 6 according to the output of the detector 110, and numeral 130 a changing device which changes the ON/OFF state of the output of the frame memory 3 inputted to the adder 10. The changing devices 120, 130 are set to restore the output of the detector 110 after being lost to the original state with a delay corresponding to one frame of the video signal. In this case, the detector 110 constitutes a fluctuation detecting means and the changing device 120 constitutes a signal changing means.

Operation of the second embodiment will be described.

The plural cameras 8 are not synchronously coupled but individually transmit the video signals to the changing device 200. The video signals inputted through the changing device 200 to the video encoding device 100 are converted in A/D conversion by the A/D converter 1, and then processed in pre-processing by the pre-processor 40 and also inputted to the detector 110 so as to perform synchronous signal separation and phase difference detection. The video signal after finishing the pre-processing is converted into the difference signal between frames to that being one frame before the frame memory 3 by the subtractor 6, and the difference signal is inputted to the changing device 120. Both the difference signal between frames and the original video signal are inputted to the changing device 120, but the difference signal between frames is usually outputted from the changing device 120 as shown in FIG. 8. The difference signal between frames outputted from the changing device 120 is subjected to the quantization encoding by the quantization encoding member 7, and then outputted to the outside and also subjected to the quantization decoding by the quantization decoding member 9. On the other hand, in the changing device 130, since output of the frame memory 3 is usually outputted without changing, the difference signal between frames subjected to the quantization decoding and outputted by the quantization decoding member 9 is added in the added 10 to the frame memory output outputted from the changing device 130, and the added output is written to the frame memory 3 to provide for processing for the of next frame.

Studying the operation when the changing device 200 for changing the cameras 8 is changed, since the output video signal becomes discontinuous just after the changing, the detector 110 detects the significant phase shift in synchronous signal. If the detector 110 detects the phase shift, the quantization encoding member 7 stops the encoding of the picture image and prevents the fluctuation of the picture image. At the same time, the changing device 120 for input of the quantization encoder 7 is changed to output the original video signal, and also the changing device 130 for input of the adder 10 is changed so that the output of the frame memory 3 is not supplied to the adder 10. If the apparatus finishes redrawing of the synchronous signal, output of the detector 110 is lost and the quantization encoding member 7 starts encoding of the original video signal. Then, output of the quantization decoding member 9 is written without changing to the frame memory 3. When encoding of the original video signal corresponding to one frame is finished, the changing devices 120, 130 are reset to the normal state and the original encoding of the difference signal between frames is started.

The above-mentioned operation of the second embodiment is compared with that of FIG. 7 as follows:

(i) Since time fluctuation of the synchronous signal is detected just after changing of the changing device 120 and operation of the quantization encoding member 7 is stopped, irregularity of the picture image due to encoding of the insignificant difference signal between frames is eliminated.

(ii) Only just after detecting the finishing of re-drawing of the synchronous signal, not the difference signal between frames but the original video signal is encoded. Consequently, restoring to the original picture image is rapid in comparison to the case that the difference signal between frames is used without changing. Although the picture image becomes irregular at changing the changing device 120 and is restored slowly in the prior art, the picture image stands still just after the changing and is restored rapidly in the embodiment.

Third Embodiment:

Before describing a third embodiment of the invention specifically, background art as the basis of the third embodiment will be described.

FIG. 9 is a block diagram illustrating constitution of a video encoding apparatus of movement compensation type as background art of the third embodiment as hereinafter described. In FIG. 9, similar parts to those in FIG. 1-FIG. 8 are designated by the same reference numerals. Numeral 80 designates an encoding control member which converts position information of a block giving the minimum distortion and quantization encoding output in variable length encoding and outputs the variable length encoding output to a transmission path T, numeral 9 a quantization decoding member which reproduces difference signal series from the quantization encoding signals, and numeral 10 an adder which adds the quantization decoding output to the signal series of the block giving the minimum distortion and reproduces the video signal and writes it in a frame memory 3.

Operation of the prior art will be described. Analog video signals are inputted to an A/D converter 1 and converted into digital signal series. The signal series is made a block per every K elements close on the picture image by a block constituting member 2, and arrangement of the signal series is converted and then each block is outputted. The block is usually constituted in rectangular form (or square form) on the picture image. On the other hand, the video signal being one frame before the existing input signal is stored in the fram memory 3, and the signal series of plural blocks including a block at the same position as the existing input block on the picture image is synchronized with the input signal series by a reference signal generator 4, and then read and transmitted to a distortion operation member 5. FIG. 10 shows an example of position relation between the existing input block A (FIG. 10(A)) and the plural read blocks Ma including the block a at the same position as the existing block A (FIG. 10(B)) in this case. The distortion operation member 5 calculates distortion between the signal series of the input block and the signal series of the plural blocks from the frame memory 3. The distortion calculation is performed using, for example, Euclidean distortion or absolute value distortion. According to the calculation results, the block to provide the minimum distortion to the input block is selected. Assuming that the blocks as the calculation object are M in number (M: integer not less than 2) and the block to provide the minimum distortion is the l-th one among the M blocks (l=1, 2, ..., M), the distortion operation member 5 outputs the value of l and the signal series of the block. A subtractor 6 outputs the difference signal series between the input signal series and the signal series to give the minimum distortion. The quantization encoding member 7 performs the quantization encoding of the difference signal series. Both the quantization encoding signal and the value l as position information are transmitted to the encoding control member 80, and subjected to the variable length encoding and further transmitted to the actual transmission path T. The difference signal series decoded by the quantization decoding member 9 and the signal series of the block outputted from the distortion operation member 5 and giving the minimum distortion are added by the adder 10, and the added output is reproduced as the video signal and written in the frame memory 3.

In the manner as described above, the inputted video signal is formed as a block which is used to select the block most resembling those in the former frame. The newest block is compared to the selected block, the difference or error component being quantized to form a coded output signal, together with information representing which block is the most resembling one.

The video encoding apparatus in the prior art is constituted as above described. Even if a block of very high approximation exists as a result of the distortion operation, the quantization encoding is performed to the difference signal series unconditionally, thereby the amount of unrequired information may be increased. Moreover, the difference signal series including the quantization error is added to the block having the high approximation really; thereby the quantization error may be stored and the distortion of the picture image may be enlarged.

The outline of the third embodiment will now be described.

In the third embodiment, the value of the minimum distortion from a distortion operation means is compared with a prescribed threshold value by a comparison means. Only when the value of the minumum distortion is larger than the prescribed threshold value, position information of a block outputted from the distortion operation means and giving the minimum distortion and quantization encoding output of difference signal series are converted in variable length encoding by an encoding control means, and the variable length encoding signal is outputted to a transmission path. The difference signal series reproduced from the quantization encoding output is added to the signal series of the block giving the minimum distortion, and the added output is written in a video signal storing means by a writing means.

The third embodiment will be described specifically referring to FIGS. 11 through 15.

In FIGS. 11 through 15, similar parts to those in FIGS. 1 through 10 are designated by the same reference numerals. Numeral 5 designates a distortion operation member as distortion operation means which operates distortion between signal series of the input block and signal series of plural blocks, and outputs position information of a block giving the minimum distortion and the value of the distortion and the signal series, numeral 60 a comparator as comparing means which compares the value of the minimum distortion outputted from the distortion operation member 5 with the prescribed threshold value and outputs the comparison results, numeral 80 an encoding control member as encoding control means which converts the position information of the block giving the minimum distortion and the quantization encoding output in variable length encoding under control of output of the comparator 60, and outputs the variable length encoding signal to the transmission path T, and numeral 10 an adder as writing means which adds the quantization decoding output (difference signal series) to the signal series of the block giving the minimum distortion under control of output of the comparator 60, and writes the added output in the frame memory 3.

Operation of the third embodiment will be described in detail. Analog video signals are inputted and converted into digital signal series by the A/D converter 1, and further made a block per every K elements close on the picture image by the block constituting member 2. FIG. 12 shows an example of a state in the arrangement conversion of the signal series by the block formation. FIG. 12 shows the order of the signal series in arrow, wherein FIG. 12(A) shows state before the block formation and FIG. 12(B) shows state after the block formation. Symbol A designates a block in the block formation. On the other hand, a video signal being one frame before the existing input signal is stored in the frame memory 3, and the signal series of the plural blocks including the block at the same position as the existing input block on the picture image is synchronized with the input signal series by the reference signal generator 4 and then read from the frame memory 3 and transmitted to the distortion operation member 5.

FIG. 13 shows a detailed constitution example of the distortion operation member 5. In FIG. 13, numeral 51 designates distortion operation circuits, and numeral 52 designates a comparator which compares the operation results of the distortion operation circuits 51. The input signal series and the signal series of one block among outputs of the reference signal generator 4 are synchronized and inputted to the distortion operation circuits 51. Each distortion operation circuit 51 performs a prescribed distortion operation (for example, Euclidean distortion or absolute value distortion), and outputs three sorts of signals, i.e., the value of the distortion, the position information of the inputted reference signal block and the signal series, to the comparator 52 at the rearward stage. The comparator 52 compares the values of the distortion inputted from the distortion operation circuits 51 and selects the minimum value and outputs three sorts of signals, i.e., the distortion value, the position information of the reference signal block and the signal series. The signal series of the block outputted in this manner and giving the minimum distortion is inputted to the subtractor 6 shown in FIG. 11, and the difference signal series between the signal series of the block giving the minimum distortion and the input signal series inputted without passing through the distortion operation member 5 is outputted. In the processing hitherto, the information that the input signal series in block formation resembles most closely to which block in the picture image being one frame before the existing input signal and the difference signal series to the block can be obtained.

The difference signal series outputted from the subtractor 6 is subjected to the quantization encoding in the quantization encoding member 7; thereby the information amount is compressed. Various methods for the quantization encoding have been proposed, and adaptation type vector quantizatin is used in the embodiment. Detail of the adaptation type vector quantization is disclosed in "Murakami et al: Adaptation Type Vector Quantization System-Quantization between Frames, Technical Report of the Institute of Electronics and Communication Engineers of Japan, IE84-1". The principle of the vector quantization will now be briefly described.

The difference signal series of K in number are brought together into input vector x=x1, x2, ..., xK. then, the K-dimensional Euclidean signal space Rk (X E Rk) has the representative points of N in number (called output vector) yi=yi1, yi2, ..., yik, and set of the representative points is made Y=y1, y2, ..., YN. If each partition of Rk having output vector yi as the representative point (e.g., center of gravity) is made R1, R2, ..., RN and index set of yi is made I={1, 2, ..., N}, vector quantization Q is expressed as cascade connection of encoding C and decoding D.

Q(x)=yi if xERi

C:x→i if d(x, yi)<d(x, yi) for ∀j

D:i→yi

If distortion d (x, yi) represents distance between input/output vector and is defined by absolute value distortion, it follows that $$d(x, yi) = \sum_{j=1}^{k} |xj - yi, j|$$

The adaptation type vector quantization performs normalization to the input vector x. That is, conversion is performed as follows:

$$Sj = \frac{1}{\sigma} (xj - m)$$

$$m = \frac{1}{k} \sum_{j=1}^{k} xj$$

(Mean value)

$$\sigma = \frac{1}{k} \sum_{j=1}^{k} |xj - m|$$

(Variance)

Vector S=S$_1$, S$_2$, ..., S$_k$ obtained in the conversion is used as input vector in the adaptation type vector quantization. Consequently, the difference signal series of K in number can be quantized into three values i. m, σ.

FIG. 14 shows a detailed constitution example of the quantization encoding member 7 in FIG. 11. In FIG. 14, numeral 71 designates an operation member of mean value m of difference signal series x, numeral 72 an operation member of variance σ, numeral 73 a normalizing member which converts the difference signal series x into S using the operation results m, σ, numeral 74 a descrimination member which performs discrimination under prescribed condition using the operation results m, σ and the prescribed threshold value, numeral 75 a vector storage member which stores plural output vectors, and numeral 76 a distortion operation member which performs a distortion operation between the normalized difference signal series S and the output vector group of the vector storage member 75 and outputs the index i of the output vector having the minimum distortion. Operation of the quantization encoding member 7 will be described. The difference signal series x is inputted to the mean value operation member 71 where the mean value m is operated. The operation results and the difference signal series x are inputted to the variance operation member 72 where the variance σ is operated. The mean value m, the variance σ and the difference signal series x are inputted to the normalizing member 73 which converts the difference signal series x into S 1/σ (x−m) and outputs the signal series S. The signal series S is inputted to the distortion operation member 76, and the distortion operation between the signal series S and the output vector group in the vector storage member 75 is performed, and then the quantization is performed into the index i of the output vector having the minimum distortion. On the other hand, the mean value m and the variance σ are inputted to the discrimination member 74, and the discrimination is effected under prescribed condition regarding whether the existing difference signal series x is significant or not, that is, whether the signal series x has sufficient information to be encoded, and then the discrimination results, the mean value m and the variance σ are outputted. In above-mentioned operation, the difference signal series x is subjected to the quantization encoding in the mean value m, the variance σ, the index i and the results of significance/insignificance discrimination.

The description is performed again referring to FIG. 11. In FIG. 11, the value of the minimum distortion outputted by the distortion operation member 5 is transmitted to the comparator 60. the comparator 60 compares the value of the minimum distortion with the prescribed threshold value, and information regarding whether the value of the minimum distortion is less than or more than the threshold value is transmitted to the encoding control member 80 and the adder 10. The information represents a criterion whether the input signal series and the signal series of the block giving the minimum distortion closely resemble each other. When the signal series of the block giving the minimum distortion resembles the input signal series well, the picture image of excellent quality can be reproduced even if the difference signal series as output of the subtractor 6 is not encoded.

In the encoding control member 80, the position information l of the block giving the minimum distortion as output of the distortion operation member 5, the mean value m as output of the quantization encoding member 7, the variance σ, the index i and results of the significance/insignificance discrimination, that is, five sorts of information, are considered together with output of the comparator 60 and codes are assigned and the variable length encoding as a whole is performed. FIG. 15 shows an example of control condition in this case. It is understood from FIG. 15 that output of the comparator 60 in FIG. 11 assigns codes to all of the position information l, the significance/insignificance information, the index i, the mean value m and the variance σ only when the minimum distortion ≧ the threshold and the significance/insignificance information is significant, and that the comparator 60 assigns codes to only the position information l and the significance/insignificance information under other conditions. Consequently, this becomes the variable length code having the least length. In the apparatus of the prior art, since codes are assigned to all of the position information l, the significance/insignificance information, the index i, the mean value m and the variance σ even when the minimum distortion < the threshold and the significance/insignificance information is significant, unrequired information in the video reproduction is generated excessively.

Various sorts of the information of i, m, σ, significance/insignificance outputted from the quantization encoding member 7 in FIG. 11 are also inputted to the quantization decoding member 9, and the difference signal series is decoded. The quantization decoding member 9 is provided at inside with a vector storage member in similar constitution to that of the quantization encoding member 7; thereby the output vector $y_i$ is decoded from the inputted index i. Further, using the mean value m and the variance σ, conversion is performed in that $$x = \begin{cases} \sigma x(y_i + m) & \text{significance/insignificance information} \\ & \text{... significant} \\ \text{always 0} & \text{significance/insignificance information} \\ & \text{... insignificant} \end{cases}$$

thereby the vector $\hat{x}$ is decoded. The vector $\hat{x}$ obtained in this manner is added as the difference signal series by the adder 10 to the signal series of the block giving the minimum distortion as output of the distortion operation member 5. If the minimum distortion < the threshold value, i.e., if the signal series of the block giving the minimum distortion resembles the input signal series well, output of the quantization decoding member 9, i.e., the reproduced difference signal series is ignored, and output of the comparator 60 is controlled so that the signal series of the block giving the minimum distortion as output of the distortion operation member 5 is outputted without changing. In this constitution, the difference signal series including the quantization error by passing through the quantization encoding member 7 and the quantization decoding member 9 is prevented from being added to the signal series having high approximation, thus adding of excessive distortion to the reproduced picture image can be avoided. Output of the adder 10 is written to the frame memory 3 and is ready for the input signal of the next frame. Although the adaptation type vector quantization encoding is adopted as quantization encoding method in the embodiment, the invention has similar effects in the case such as vector quantization where the block encoding is not used.

According to the embodiment as above described, the video encoding apparatus comprises a distortion operation means which operates distortion between signal series of an input block in the last video signal inputted through a block constituting means and signal series of plural blocks read from a video signal storage means corresponding to the input block by a reading means and outputs the minimum distortion and the position information of the block giving the minimum distortion and the signal series, a comparison means which comprises the value of the minimum distortion with the prescribed threshold value, a quantization encoding means which performs quantization encoding of the difference signal series between the signal series of the input block and the signal series of the block giving the minimum distortion, a writing means which adds the difference signal series reproduced from the quantization encoding output through the quantization decoding means to the signal series of the block giving the minimum distortion when the value of the minimum distortion is larger than the prescribed threshold value based on the comparison results of the comparison means and writes the added output to the video signal storage means, and an encoding control means which performs variable length encoding of the position information of the block giving the minimum distortion and the quantization encoding output when the minimum distortion is larger than the threshold value and outputs the variable length encoding output to the transmission path. Accordingly, excessive information generating and storage of the quantization error can be eliminated.

Fourth Embodiment:

Before describing a fourth embodiment of the invention specifically, background art as the basis of the fourth embodiment will be described referring to FIGS. 16 and 17.

In FIGS. 16 and 17, similar parts to those in FIGS. 1 through 15 are designated by the same reference numerals. Numeral 117 designates an operation member which provides mean value and deviation component within a block of difference signal series, numeral 118 a discrimination member which compares the mean value and the deviation component with the prescribed threshold value and obtains significance/insignificance information that information is insignificant if both the mean value and the deviation component are less than the threshold value and it is significant under other conditions, numeral 119 a normalizing member which performs d.c. separation normalizing of the difference signal series using the mean value and the deviation component, numeral 7 a quantization encoding member which performs quantization encoding of output of the normalizing member 119, numeral 80 on encoding control member which converts position information of a block giving the minimum distortion, significance/insignificance information, quantization encoding output, mean value and deviation component in variable length encoding and outputs the variable length encoding output to a transmission path T, numeral 9 a quantization decoding member which decodes the quantization encoding a signal, numeral 113 a difference signal reproduction member which applies mean value adding and weighting to the quantization decoding output using the mean value and the deviation component and reproduces the difference signal series, and numeral 114 an adder which adds output of the difference signal reproduction member 113 to the signal series of the block giving the minimum distortion and reproduces the video signal and writes it to a frame memory 3.

Operation of the prior art will be described. Analog video signals are inputted to an A/D converter 1 and converted into digital signal series. The signal series is made a block per every K elements close on the picture image by a block constituting member 2, and arrangement of the signal series is converted and then each block is outputted. The block is usually constituted in rectangular form (or square form) on the picture image. On the other hand, video signal being one frame before the existing input signal is stored in the frame memory 3, and signal series of plural blocks including a block at the same position as the existing input block on the picture image is synchronized with the input signal series by a reference signal generator 4, and then read and transmitted to a distortion operation member 5. FIG. 17 shows an example of position relation between the existing input block A (FIG. 17(A)) and the plural read blocks Ma including the block a at the same position as the existing block A on the picture image (FIG. 17(B)) in this case. The distortion operation member 5 calculates distortion between the signal series of the input block and the signal series of the plural blocks from the frame memory 3. The distortion calculation is performed using, for example, Euclidean distortion or absolute value distortion. According to the calculation results, the block to provide the minimum distortion to the input block is selected. Assuming that the blocks of the calculation object are M in number (M: integer not less than 2) and the block to provide the minimum distortion is the l-th one among the M blocks (l=1, 2, ..., M), the distortion operation member 5 outputs the value of l and the signal series of the block. A subtractor 6 outputs the difference signal series between the input signal series and the signal series to give the minimum distortion. The mean value/deviation operation member 117 operates the mean value and the deviation within the block of the difference signal series. The discrimination member 118 has prescribed threshold values $Th_1$ and $Th_2$ to the mean value and the deviation respectively, and performs discrimination in that If mean value $< Th_1$ and deviation $< Th_2$ significance/insignificance information→insignificant If mean value $\geq Th_1$ or deviation $\geq Th_2$ significance/insignificance information→significant The normalizing member 119 subtracts the mean value from each signal of the difference signal series and performs division by the deviation; thereby the normalized difference signal series is obtained.

The quantization encoding member 7 performs the quantization encoding of the normalized difference signal series. The quantization encoding signal, the mean value, the deviation, the significance/insignificance information and the position information l of the block giving the minimum distortion are transmitted to the encoding control member 80, and subjected to the variable length encoding and further transmitted to the actual transmission path T.

If the significance/insignificance information is significant, all sorts of information inputted to the encoding control member 80 are subjected to the variable length encoding. However, if it is insignificant, only the significance/insignificance information and the position information l are subjected to the variable length encoding and outputted so as to reduce the amount of information generated.

The normalized difference signal series decoded by the quantization decoding member 9 is subjected to multplication of the deviation and addition of the mean value by the difference signal reproduction member 113 and thereby reproduced as the difference signal series. However, if the significance/insignificance is insignificant, the difference signal series entirely becomes 0. The difference signal is added to the signal series of the block giving the minimum distortion by the adder 114, and the adding output is reproduced as the video signal and written in the frame memory 3.

In the manner as described above, the inputted video signal is formed as a block which is used to select the block most resembling those in the former frame. The newest block is compared to the selected block, the difference or error component being quantized to form a coded output signal, together with information representing which block is the most resembling one.

The video encoding apparatus in the prior art is constituted as above described. Property of the inputted video signal becomes significant when the reference block at the same position on the picture image is used. If the appearing frequency of the blocks being insignificant becomes high by using the plural reference blocks, the video encoding apparatus is effective to reduce the information amount. However, if the appearing frequency of the blocks being significant becomes high by using the plural reference blocks, the information amount may be increased by the position information of the reference blocks.

Outline of the fourth embodiment will now be described.

In the fourth embodiment, in order to discriminate approximation between plural reference blocks and an input block, mean value and deviation component of difference signal series are used although these are used only to discriminate whether information is significant or not in the prior art. Thus the discrimination means discriminate not only the significance/insignificance information but also the approximation. If information does not become insignificant even at a block of the highest approximation, difference signal series between the input block and a block at the same position as the input block is subjected to quantization encoding, and position information of the reference blocks need not be transmitted by using the quantization encoding output.

The fourth embodiment will be described specifically referring to FIGS. 18 through 21.

In FIGS. 18 through 21, similar parts to those in FIGS. 1 through 17 are designated by the same reference numerals. Numeral 150 designates a subtractor as first operation means which outputs difference signal series between signal series of an input block and signal series of plural blocks, numeral 160 a mean value/deviation operation member as second operation means which operates mean value and deviation component within each block of the plural difference signal series, numeral 170 a discrimination member as discrimination means which selects a block having the highest approximation to signal series of the input block (most approximate block) from the mean value and the deviation component of each block based on prescribed procedure and outputs the position information and also compares the mean value and the deviation component of the most approximate block with the prescribed threshold value and discrimination whether the input block is significant or not and outputs the significance/insignificance information, numeral 119 a normalizing member which performs d.c. separation normalizing to difference signal series corresponding to a same position block using output of the subtractor 150 corresponding to a block at the same position as the input block on the picture image (same position block) and output of the mean value/deviation operation member 160 corresponding to the same position block, numeral 80 an encoding control member as encoding control means which converts quantization encoding output of a quantization encoding member 7, the mean value and the deviation component of the same position block outputted from the mean value/deviation operation member 160 and the position information and the significance/insignificance information of the most approximate block outputted from the discrimination member 170 into variable length encoding and outputs the variable length encoding signal, numeral 9 a quantization decoding member as quantization decoding means which decodes the quantization encoding output, numeral 113 a difference signal reproduction member which applies mean value adding and weighting to the quantization decoding output using the mean value and the deviation component and reproduces the difference signal series corresponding to the same position block, and numeral 180 a video signal reproduction member as video signal reproduction means which writes the reference signal series corresponding to the same position block among outputs of the reference signal generator 4 added to the reproduced difference signal series corresponding to the same position block or the reference signal series itself corresponding to the most approximate block shown by the position information among outputs of the reference signal generator 4 to the frame memory 3 under control of the significance/insignificance information.

Operation of the fourth embodiment will be described in detail. Analog video signals are inputted and converted into digital signal series by the A/D converter 1, and further made a block per every K elements close on the picture image by the block constituting member 2. FIG. 19 shows an example of a state in the arrangement conversion of the signal series by the block formation. FIG. 19 shows the order of the signal series in arrow, and FIG. 19(a) shows state before the block formation and FIG. 19(b) shows state after the block formation. Symbol A designates a block in the block formation. On the other hand, video signal being one frame before the existing input signal is stored in the frame memory 3, and the signal series of the plural blocks including the block at the same position as the existing input block on the picture image is synchronized with the input signal series by the reference signal generator 4 and then read from the frame memory 3 and transmitted to the subtractor 150.

FIG. 20 shows a detailed constitution example of the subtractor 150. In FIG. 20, the input signal series and the reference signal series of the plural blocks are synchronized and inputted to each subtractor thereby the difference signal series corresponding to each reference block can be obtained. The reference signal series of the plural blocks include the reference signal series of the same position block, and the difference signal series corresponding to this is transmitted to the mean value/deviation operation member 160 and also to the normalizing member 119 shown in FIG. 18 in similar manner to other reference blocks.

FIG. 21 shows a detailed constitution example of the mean value/deviation operation member 160. In FIG. 21, numeral 161 designates an accumulator which accumulates the inputted signal series within the block, numeral 162 a divider which divides the inputted signals by the number K of elements within the block, numeral 164 a subtractor which performs subtraction of $\epsilon_i^n - m^n$, and numeral 163 a calculator which performs absolute value calculation. Assume that the reference blocks are M in number (M: integer not less than 2) and the difference signal series corresponding to the M blocks are represented by $\epsilon^0, \epsilon^1, \ldots, \epsilon^n, \ldots, \epsilon^{M-1}$ respectively. Wherein, $\epsilon^0$ is the difference signal series corresponding to the same position block.

The mean value/deviation operation member 160 performs following operation to the difference signal series $\epsilon^n = (\epsilon_1^n, \epsilon_2^n, \ldots, \epsilon_k^n)$ thereby the mean value $m^n$ and the deviation component $\sigma^n$ can be obtained.

$$m^n = \frac{1}{K} \sum_{i=1}^{k} \epsilon_i^n$$

$$\sigma^n = \frac{1}{K} \sum_{i=1}^{k} |\epsilon_i^n - m^n|$$

The mean value $m^n$ and the deviation component $\sigma^n$ corresponding to each reference block outputted from the mean value/deviation operation member 160 are transmitted to the discrimination member 170 where the most approximate block is selected and the significance/insignificance discrimination of the block is performed.

The object of the selection of the most approximate block is that the significance/insignificance information finally becomes insignificant. Consequently, the following procedure is used as the method of selecting the most approximate block.

(i) Among inputted M blocks of ($m^n$, $\sigma^n$), select one block to satisfy that $m^n < Th_1$ and $\sigma^n < Th_2$. Wherein, $Th_1$ and $Th_2$ are threshold values for the significance/insignificance discrimination.

(ii) If there is no block to satisfy the condition, the significance/insignificance information is deemed as significant and outputted.

(iii) If there is any block to satisfy the condition, the significance/insignificance information is deemed as insignificant and outputted. In order to select the most approximate block among plural blocks to satisfy the condition, an estimation function is set as hereinafter described.

$$\gamma n = \alpha |m^n| + \beta \sigma^n \; (\alpha, \beta: \text{constant})$$

A block corresponding to ($m^n$, $\sigma^n$) to minimize $\gamma$ is made the most approximate block. If $\gamma l$ at n=1 (l: any integer among 1-M) becomes minimum, l is deemed as the position information of the most approximate block and outputted.

Operation is further described in the case of significance and insignificance of information.

(a) In the case of insignificance

Only the significance/insignificance information and the position information of the most approximate block are converted in variable length encoding by the encoding control member 80 and transmitted to the transmission path T. In the video signal reproduction member 180, the reference signal series of the most approximate block shown by the position information from the reference signal generator 4 is read and written in the frame memory 3 and is ready for inputting of the video signal to next frame.

(b) In the case of significance

In the case of significance, the most approximate block is not used but the same position information becomes the object. Among the difference signal series outputted from the subtractor 150, $\epsilon^0$ corresponding to the same position block and $m^0$, $\sigma^0$ outputted from the mean value/deviation operation member 160 are inputted to the normalizing member 119, where following operation is performed to $\epsilon^0$ thereby the normalized signal series $x^0$ is obtained.

$$x^0 = \frac{1}{\sigma^0} (\epsilon^0 - m)$$

Signal $x^0$ obtained in this manner is transmitted to the quantization encoding member 7 and the information amount is compressed. In the embodiment, vector quantization is used in the quantization encoding member 7.

The vector quantization will now be briefly described. The input signal series of K in number are brought together into input vector $x = \{x_1, x_2, \ldots, x_K\}$. Then, the K-dimensional Euclidean signal space $R^k$ ($x \in R^k$) has the representative points of N in number (called output vector) $y_i = \{y_{i1}, y_{i2}, \ldots, y_{ik}\}$, and set of the representative points is made $Y = \{y_1, y_2, \ldots, y_N\}$. If each partition of $R^k$ having output vector $y_i$ as the representative point (e.g., center of gravity) is made $R_1, R_2, \ldots, R_N$ and index set of $y_i$ is made $I = \{1, 2, \ldots, N\}$, vector quantization Q is expressed as cascade connection of encoding C and decoding D as follows:

$Q = (x) = y_i$ if $x \in R_i$ $C: x \to i$ if $d(x, y_i) < d(x, y_j)$ for $\forall j$ $D: i \to y_i$ If distortion $d(x, y_i)$ represents distance between input/output vector and is defined by absolute value distortion, it follows that $$d(x, y_i) = \sum_{j=1}^{k} |x_j - y_{i,j}|$$

The signal series $x^0$ inputted to the quantization encoding member 7 by the vector quantization encoding is converted in quantization encoding to the index I and outputted.

In the encoding control member 80, the significance/insignificance information, the mean value estimated using the same position block as the reference signal, the deviation component and the quantization encoding output, that is, four sorts of signals, are converted in variable length encoding and outputted to the transmission path. In this case, the position information of the most approximate block becomes unnecessary.

In the quantization decoding member 9, the index I outputted from the quantization encoding member 7 is converted in vector quantization decoding thereby the signal series $y^0 = \{y_1^0, y_2^0, \ldots, y_k^0\}$ is obtained. In the difference signal reproduction member 113, operation of mean value adding and weighting $$\hat{\epsilon}^0 = \sigma^0 y^0 + m^0$$

is performed, and the difference signal series corresponding to the same position block is reproduced and outputted. In the video signal reproduction member 180, the reference signal series of the same position block is read from the reference signal generator 4, and the difference signal series reproduced by the difference signal reproduction member 113 is added thereto, and the added output is written in the frame memory and is ready for the video signal in next frame.

According to the embodiment as above described, the video encoding apparatus comprises a first operation means which operates the difference signal series between signal series of an input block in the last video signal inputted through a block constituting means and signal series of plural blocks read from a video signal storage means corresponding to the input block by a reading block, a second operation means which operates a mean value and deviation component of the difference signal series per each block, a discrimination means which discriminates the most approximate block having the highest approximation to the input block from the mean value and the deviation component of the difference signal series of each block and outputs the position information and also compares the mean value and the deviation component with the prescribed threshold value and discriminates whether the input block is significant or not and outputs the significance/insignificance information, a quantization encoding means which performs quantization encoding of the difference signal series corresponding to the same position block from the first operation means, a quantization decoding means which decodes the quantization encoding output, a video signal reproduction means which writes the reference signal series decoded by the quantization decoding means and added to the signal series of the same position block read by the reading means to the video signal storage means if the significance/insignificance information is significant and also writes the signal series of the most approximate block read by the reading means on the basis of the position information to the video signal storage means if the significance/insignificance information is insignificant, and an encoding control means which inputs the quantization encoding output and the position information and the significance/insignificance information and performs the variable length encoding to the inputted signals except the position information if the significance/insignificance information is significant and to the inputted signals except the quantization encoding output if the significance/insignificance information is insignificant and then transmits the variable length encoding output to the transmission path. Accordingly, when the significance/insignificance information is significant, the same position block corresponding to the input block is used and the position information becomes unnecessary; thereby increase of the information amount can be suppressed even when many significant input blocks exist due to the property of the picture screen.

Fifth Embodiment:

Before describing a fifth embodiment of the invention specifically, background art as the basis of the fifth embodiment will be described referring to FIG. 22.

FIG. 22 is a block diagram illustrating constitution of a vector quantization encoder as background art of the fifth embodiment. In FIG. 22, similar parts to those in FIGS. 1 through 21 are designated by the same reference numerals. Numeral 101 designates an input vector register which holds input signal series in a block, numeral 102 a code table address counter which forms address of a code table, numeral 103 an output vector code table memory which stores an output vector, numeral 104 an output vector code table register which holds data read from the output vector code memory, numeral 105 a parallel subtractor which calculates the difference between the value of the input vector register 101 and the value of the output vector code table register 104, numeral 106 a parallel absolute value calculator which calculates the absolute value of output of the parallel subtractor, numeral 107 an absolute value distortion detector which detects the absolute value distortion input/output vector, numeral 108 a minimum distortion detector which detects the output vector to minimize the absolute value of the input/output vector, and numeral 109 an index latch which holds the index of output vector to minimize distortion based on the output signal of the minimum distortion detector 108.

Operation of the prior art will be described. The input vector series of K in number are brought together into a block of input vector $x=\{x_1, x_2, \ldots, x_k\}$ and taken in the input vector register 101. Then, count up is effected to the code table address counter 102 in sequence up to $i=1, 2, \ldots, N$, and the output vector $y_i=\{y_{i1}, y_{i2}, \ldots, y_{ik}\}$ is read in sequence from the output vector code table memory 103 and then latched to the output vector code table register 104. The parallel subtractor 105, the parallel absolute value calculator 106 and the absolute value distortion detector 107 estimate the absolute value distortion $d_i$ of input/output vector for each output vector $y_i$ in the following operation.

$$d_i = d(x, y_i) = \sum_{j}^{k} |x_j - y_{ij}|$$

The minimum distortion detector 108 detects the output vector to minimize the absolute value distortion $d_i$. The minimum distortion d is $$d = \min d(x, y_1) = \min[\Sigma |x_j - y_{ij}|]$$

The minimum distortion detector 108 calculates the distortion d (x, $y_i$) between the output vector $y_i$ read in sequence from the output vector code table memory 103 and the input vector x, and compares the calculated value with the minimum value in the past. If a smaller value is detected, the minimum distortion detector 108 holds this value as the new minimum distortion and transmits the strobe signal to the index latch 109 at evey time of holding and takes the index signal i being the code table address of the output vector into the index latch 109. The above-mentioned procedure is continued until the output vector $y_i$ is read entirely (i=1–N) from the output vector code table memory 103; thereby the full search is finished. Then, the index i of the output vector to give the minimum distortion remains in the index latch, and this becomes the encoding output.

The term "full search" is usually employed in the field of vector quantization to mean such operation that distortion calculation and distortion comparison are performed between all of the output vectors ($y_1$) to ($y_N$) thereby to obtain an output vector ($y_1$) showing the minimum distortion, when searching the output vector providing the minimum distortion to the input vector from the output vectors ($y_1$) to ($y_N$) which have previously been provided in a code table.

The above-mentioned apparatus is the full search vector quantization member to constitute the vector quantization encoding member.

The outline of the fifth embodiment will now be described.

In the fifth embodiment, allowable distortion is set to a distortion discrimination circuit, and when distance (distortion) between input vector and output vector becomes less than the allowable distortion during search of the output vector to give the minimum distortion, the index signal of the output vector is converted in variable length encoding and the encoding output is obtained thereby the encoding efficiency is improved.

The fifth embodiment will be described specifically.

FIG. 23 is a block diagram illustrating the constitution of the fifth embodiment. In FIG. 23, numeral 310 designates a full search vector quantization member having similar constitution to that described in FIG. 22 (hereinafter referred to as "FSVQ member" including FIG. 22 as a whole), numeral 320 a distortion discrimination circuit which discriminates that the absolute value distortion $d_i$ becomes less than the prescribed allowable distortion $d\theta$, and numeral 330 a variable length encoding circuit which converts the index signal i of the output vector in variable length encoding and obtains the encoding output when the absolute value distortion $d_i$ and the allowable distortion $d\theta$ becomes $d_i \leq d\theta$ based on the output signal of the distortion discrimination circuit.

FIG. 24 is a block diagram illustrating detailed constitution of the FSVQ member 310 in the fifth embodiment. In FIG. 24, similar parts to those in FIG. 22 are designated by the same reference numerals. In place of the code table address counter 102 shown in FIG. 22, a code table address counter 102 with reset function is used and can be reset by output of the distortion discrimination circuit 320. The apparatus in FIG. 24 is similar to that in FIG. 22 except for the above-mentioned difference.

Operation of the fifth embodiment in above-mentioned constitution will be described.

In the decoding member, the input signal series of K in number are brought together into a block of input vector $x=\{x_1, x_2, \ldots, x_k\}$ and inputted to the FSVQ member 310. In the FSVQ member 310, the input vector x is taken into the input vector register 101, and count-up is effected to the code table counter 102 with reset function in sequence up to i=1 to N; thereby the output vector $y_i=\{y_{i1}, y_{i2}, \ldots, y_{ik}\}$ is read from the output vector code table memory 103 and then latched in sequence to the output vector register 104.

Next, the parallel subtractor 105, the parallel absolute value calculator 106 and the absolute value distortion detector 107 estimate the absolute value distortion $d_i$ between the input vector x and each output vector $y_i$ as expressed in following formula.

$$d_i = d(x, y_i) = \sum_{j=1}^{K} |xj - yij|$$

The minimum distortion detector 108 compares the absolute value distortion $d_i$ with the minimum value in the past. If a smaller value is detected, the minimum distortion detector 108 holds this value as new minimum distortion and outputs it to the distortion discrimination circuit 320. The minimum distortion detector 108 transmits the strobe signal to the index latch 109 at every time of holding and takes the index signal i being code table address of the output vector $y_i$ into the index latch 109 and then outputs it to the variable length encoding circuit 330. The above-mentioned procedure is performed every time the count of the code table address counter 102 with reset function is subjected to count-up from i=1 to N. The distortion discrimination circuit 320, which receives the output $d_i$ of the minimum distortion detector 108, compares it with the prescribed allowable distortion $d\theta$. When relation $d\theta \geq d_i$ applies, the distortion discrimination circuit 320 transmits the index latch signal to the variable length encoding circuit 330 and makes the circuit 330 to take the index latch signal i. The distortion discrimination circuit 320 also transmits the reset signal to the code table address counter 102 with reset function and finishes the count and resets it to i=1. The variable length encoding circuit 330 taking the index signal i entirely deletes "0" continuing from most significant bit of the index signal i to least significant bit thereby reducing the code length. Such procedure is performed in every index signal i taken therein, and variable length encoding is performed; thereby the encoding output is obtained.

According to the embodiment as above described, the distortion di between the input vector x and the output vector yi is compared with the prescribed allowable distortion $d\theta$. When condition $di \leq d\theta$ applies, the search is stopped and the index signal i of the output vector at this time is converted in variable length encoding and the encoding output is obtained. Accordingly, the encoding efficiency is significantly improved; thereby the high speed processing is achieved.

Sixth Embodiment

Before describing a sixth embodiment of the invention specifically, tree search vector quantization as background art of the sixth embodiment will be described.

As shown in FIG. 30, studying a binary tree where two branches are separated from each node R, a root of the tree corresponds to K-dimensional signal space $R^K$ and each node corresponds to a space by partitioning the space $R^K$ stepwise. Each space has a representative point (e.g., center of gravity) which becomes a K-dimensional output vector. Based on distribution of output vector and input vector in each step, the total amount of distortion between input/output vector is specified to become minimum.

When input vector is given, in each of steps from the first step up to the last step, distortion to output vector corresponding to two partition nodes is compared and a branch with less distortion is selected; thereby the output vector corresponding to the node at the last end is selected. If the last step is the n-th step, nodes at the last end are $2^n$ in number. Tree search vector quantization (TSVQ) has been described. FIG. 30 shows an example when n=3.

FIG. 25 shows a constitution example of a tree search vector quantizer at n=3. In FIG. 25, numeral $V_1$ designates input signal vector in a block per every K ones, numeral 420 a first step of TSVQ encoder to which the input signal vector is inputted, numeral $V_3$ first step output vector index outputted from the first step of TSVQ encoder, numeral 440 a second step of TSVQ encoder to which the first step output vector index is inputted, numeral $V_s$ second stage output vector index outputted from the second step of TSVQ encoder, numeral 460 a third step of TSVQ encoder to which the second step output vector index is inputted, and numeral $V_7$ third step output vector index outputted from the third step of TSVQ encoder. FIG. 26 shows a detailed constitution example of the second step 440 of TSVQ. In FIG. 26, numeral 441 designates an input vector register to which the input signal vector $V_1$ is inputted, numeral 442 a second step output vector code table to which the output vector index $V_3$ is inputted, numeral 443 a distortion operation circuit which calculates distortion between the input signal outputted from the input vector register 441 and the output vector index outputted from the second step output vector code table 442, numeral 445 a distortion comparison circuit which estimates the minimum value of distortion calculated by the distortion operation circuit 443, numeral $V_9$ designates distortion comparison result signal outputted from the distortion comparison circuit 445, and numeral 446 an index register which outputs the second step output vector index $V_5$ based on the distortion comparison result signal $V_9$ and the first step output vector index signal $V_3$.

Operation of the tree search vector quantizer will be described. The tree search vector quantization is in repetition of procedure that distortion comparison between two output vectors in a pair and an input signal vector is performed at each step, and a pair of output vectors to be compared at next step is determined. The distortion operation of the tree at three steps shown in FIG. 30 corresponds to the first step 420, the second step 440 and the third step 460 of TSVQ encoder shown in FIG. 25. In each step, a distortion operation is performed between a pair of output vectors assigned on the basis of distortion comparison results to the previous step and an input vector and that of less distortion is determined, and the information is added to the comparison results of the previous step and then transmitted to the next step. Since the first step has only one pair of output vectors, comparison results to the previous step are not required and therefore do not exist. Assuming that the output index $V_3$ outputted on the basis of distortion comparison results in the first step be $i_1$, in the second step, distortion operation is performed between a pair of output vectors determined by $i_1$ and an input vector, and the comparison results are added to $i_1$ so as to form $i_2$ 5. In the third step, $i_3$ 7 is outputted by $i_2$ and input. In FIG. 30, assuming that "0" is assigned if a branch at the left is selected and "1" is assigned if a branch at the right is selected, indexes $i_1$, $i_2$, $i_3$ become the binary sequence of one column, two columns and three columns respectively, and vector $i_3$ of the binary sequence becomes the output vector index at the last step. Thus operation of the tree search vector quantizer has been described.

The output vector code table in each step must store a pair of output vectors assigned on the basis of results in the previous stage as shown in FIG. 29, that is, output vector index of $y_0$, $y_1$ at the first step, $y_{00}$, $y_{01}$, $y_{10}$, $y_{11}$ at the second step, and $y_{000}$, $y_{001}$, $y_{010}$, $y_{011}$, $y_{100}$, $y_{101}$, $y_{110}$, $y_{111}$ at the third step.

The outline of the sixth embodiment will now be described.

In the sixth embodiment, one of output vector indexes stored in a vector code table at initial step of an encoder is selected on the basis of an initial pseudo output vector index and an input signal vector inputted to the initial step of the encoder, and first step output vector index is outputted from the initial step of the encoder.

Code "0" is added to upper position of output vector with shorter code length so as to equalize the code length, and distortion between the pseudo output vector index with equalized code length and the input signal vector is calculated by an operation circuit.

Consequently, a vector code table of an encoder in each step can be made common.

The sixth embodiment will be described specifically in the case that a search is performed at three steps and the initial pseudo index is "001" (BIN) referring to FIGS. 27 through 29.

FIG. 27 is a block diagram of a tree search vector quantization encoder of the embodiment where the search is performed at three steps. In FIG. 27, similar parts to those in FIG. 25 are designated by the same reference numerals. In FIG. 27, numeral $V_4$ designates the initial pseudo output vector index, numeral 420 a first step of TSVQ encoder in the sixth embodiment to which the initial pseudo output vector index $V_4$ and the input signal vector are inputted, numeral $V_6$ first step pseudo output vector index outputted from the first step 420 of TSVQ encoder, numeral 440 a second step of TSVQ encoder to which the input signal vector $V_1$ and the first step pseudo output vector index $V_6$ are inputted, numeral $V_8$ second step pseudo output vector index outputted from the second step 440 of TSVQ encoder, and numeral 460 a third step of TSVQ encoder to which the input signal index $V_1$ and the second step output vector index $V_8$ are inputted.

FIG. 28 is a block diagram of the second step of TSVQ encoder of the embodiment shown in detail. In FIG. 28, an output vector code table 442 of the second step 440 of TSVQ encoder has a second step output vector code table #0 and a second step output vector code table #1.

The input signal vector $V_1$ is inputted through an input vector register 441 to a distortion operation circuit 443. The distortion operation circuit 443 calculates distortion between the vector index stored in the second step output vector code table #0 and the second step output vector code table #1 and the input signal vector $V_1$, and inputs the calculation results to a second step distortion comparison circuit 445. Based on the calculation results of the distortion operation circuit 443, the second step distortion comparison circuit 445 outputs a distortion comparison result signal $V_9$ in "0" or "1", and the distortion comparison result signal $V_9$ and the first step pseudo output vector index $V_6$ inputted to the output vector code table 442 are inputted to a pseudo index shift register 446. The pseudo index shift register 446 outputs a second step pseudo output vector index $V_8$.

The first step 420, the second step 440 and the third step 460 of TSVQ encoder constitute a vector quantization apparatus 500 as a whole.

Operation of the sixth embodiment will be described when the initial pseudo index is made "001" (BIN). FIG. 29 shows address map when search of the output vector code tables #0, #1 common to each search step is performed in three steps. Distortion between the input signal vector $V_1$ inputted to the first step of TSVQ and vector indexes $y_0$, $y_1$ outputted from the output vector code tables #0, ·1 by the initial pseudo output vector index $V_4$ being "001" (BIN) is calculated in the distortion circuit 443. Based on the calculation results of the distortion operation circuit 443, the distortion comparison circuit 445 selects one output vector to give the minimum distortion and then outputs the distortion comparison result signal $V_9$ based on the comparison results. The pseudo index shift register 446 adds the distortion comparison result signal $V_9$ to the least significant bit (LSB) of the first step pseudo output vector index $V_6$ and further truncates the most significant bit (MSB) and feeds the second pseudo output vector index to next step. Such procedure is further effected in the second step and third step, thereby in the third step pseudo index shift register, any of the least significant bit (LSB) being "1" of the initial pseudo output vector index is truncated and the required third step output vector index $V_7$ can be obtained. More specifically, in the first step, according to the initial pseudo output vector index "001" (BIN), if the vector index $y_0$ is outputted from the output vector code table #0 to the output vector and the vector index $y_1$ is outputted from the output vector code table #1 thereto and the vector index $y_0$ of the output vector code table #0 is selected, the distortion comparison result signal $V_9$ becomes "0" and the pseudo index shift register 446 adds the least significant bit (LSB) being "0" of the initial pseudo output vector index $V_4$ being "001" and further truncates the most significant bit (MSB) being "0". This is expressed as follows:

001(BIN)→0010(BIN)→010(BIN)

In the second step of TSVQ encoder, according to the first step pseudo output vector index $V_6$ being "010"

(BIN), if the vector index $y_{00}$ is outputted from the output vector code table #0 and the vector index $y_{01}$ is outputted from the output vector code table #1 and the vector index $y_{01}$ of the output vector code table #1 is selected, the second step pseudo output vector index $V_8$ becomes $$010(BIN) \rightarrow 0101(BIN) \rightarrow 101(BIN)$$

In the third step of TSVQ encoder, according to the second step pseudo output vector index $V_8$ being "101" (BIN), if the vector indexes $y_{010}$, $y_{011}$ are outputted from the output vector code tables #0, #1 respectively and the vector index $y_{011}$ of the output vector code table #1 is selected, it follows that $$101(BIN) \rightarrow 1011(BIN) \rightarrow 011(BIN)$$

Thus the initial pseudo output vector index disappears and the index "011" (BIN) of the vector index $y_{011}$ is obtained as the third step output vector index (encoding output) $V_7$.

This search process coincides with the root in FIG. 27.

According to the embodiment as above described, code "0" is added by the necessary number to the upper position of the output vector index with shorter code length so as to equalize the code length, and the initial pseudo output vector index being not overlapped with the pseudo output vector index by equalizing the code length is inputted to the encoder at the first step. In the vector code table of the encoder at each step, since the pseudo output vector and the initial pseudo output vector index are constituted by equalizing the code length, the memory content to constitute the output vector code table in each step can be made common and therefore can be reduced.

Seventh Embodiment

Before describing a seventh embodiment of the invention specifically, background art as the basis of the seventh invention will be described referring to FIG. 31.

In FIG. 31, similar parts to those in FIGS. 1 through 30 are designated by the same reference numerals. In FIG. 31, numeral $S_{g1}$ designated a video signal, numeral 6 a subtractor, numeral 3 a frame memory, numeral 511 a transmission buffer, numeral 7 a mean value separation normalizing vector quantization encoder, numeral $S_{g2}$ quantization output, numeral 517 a variable length encoder, numeral $S_{g3}$ encoding output, numeral 522 a raster/block scan conversion member, numeral 523 a video signal block, numeral 524 a prediction error signal block, numeral 526 a reproduction prediction error signal block, numeral 527 a reproduction video signal block, and numeral $S_{g4}$ a feedback control signal.

Operation of an interframe vector quantization encoder shown in FIG. 31 will be described. The video signal $S_{g1}$ is digitized and a signal series is given in sequence of the raster scan direction. The raster/block scan conversion member 522 partitions the video signal $S_{g1}$ into K blocks (K: integer), and performs the scan conversion in sequence of the block as a unit. Assume that the video signal block 523 in block formation in f-th frame is expressed as $S=(S_1, S_2, \ldots, S_k)$. Further, if the prediction error signal block 525 as the difference between the video signal block 523 calculated by the subtracter 6 and the prediction signal block 524 is made $e_f$, the reproduction prediction error signal block 526 formed by the mean value separation normalizing vector quantization encoder 7 and the mean value separation normalizing vector quantization encoder 9 is made $\hat{e}_f$, the reproduction video signal block 527 is made $\hat{S}_f$, and the prediction signal block 524 obtained as the reproduction video signal block 527 supplied with delay of one frame period by the frame memory 3 is made $P_f$, it follows that $$e_f = S_f - P_f$$

$$\hat{e}_f = e_f + Q$$
$$\hat{S}_f = P_f + \hat{e}_f = S_f + Q$$

$$P_f = \hat{S}_f Z^{-t}$$

Wherein, Q represents vector quantization error, and $Z^{-t}$ represents delay of one frame period by the frame memory 3. This is basically a DPCM system (difference pulse modulation system) between frames. The quantization output $S_{g2}$ of the mean value separation normalizing vector quantization encoder 7 is converted in variable length encoding by the variable length encoder 517, and then transmitted to the transmission buffer 511 and outputted as the encoding output $S_{g3}$ to the transmission path. The transmission buffer 511 supervises the transmission information amount, and controls the threshold value in the mean value separation normalizing vector quantization encoder 7 by the feedback control signal $S_{g4}$ so as to control the encoding data amount.

The mean value separation normalizing vector quantization encoding is described in detail in "T. Murakami, K. Asai, E. Yamazaki: High Efficiency Endoding of Picture Image by Vector Quantization, report in No. 6 symposium regarding the information theory and its application (1983) pp. 77–82" (reference 1) and "T. Murakami, K. Asai: Vector Quantizer of Video Signal, published by the Institute of Television Engineers in Japan (1984) pp. 452–457" (reference 2). Consequently, the detailed description shall be omitted here.

Outline of the seventh embodiment will now be described.

In an interframe vector quantization encoder of the seventh embodiment, significance/insignificance discrimination is performed to prediction error signal series the difference between frames of the video signal, and only significant picture elements are brought together into a block and mean value separation normalizing vector quantization encoding is performed. Accordingly, noise in block formation is reduced in the video signals and the video transmission is achieved at high quality.

The seventh embodiment will be described specifically referring to FIG. 32.

FIG. 32 is a block diagram of an interframe vector quantization encoder in the seventh embodiment. In FIG. 32, similar parts to those in FIGS. 1 through 31 are designated by the same reference numerals. In FIG. 32, numeral 3 designates a frame memory, numeral $S_{g5}$ prediction signal series, numeral $S_{g6}$ prediction error signal series, numeral 560 a raster circuit, numeral $S_{g7}$ reproduction prediction error signal series, numeral $S_{g8}$ reproduction video signal series, numeral 590 a significance/insignificance discrimination circuit, numeral 510 a block circuit, numeral 511 a transmission buffer, numeral $S_{g9}$ a feedback control signal, numeral $S_{g10}$ significance/insignificance information, numeral $S_{g11}$ a block signal, numeral 7 a mean value separation normalizing vector quantization encoder, numeral $S_{g2}$ quantization output, numeral 517 a variable length encoder, numeral $S_{g3}$ encoding output, numeral 9 a mean value separation normalizing vector quantization decoder, numeral $S_{g12}$ a reproduction block signal, and numeral 10 an adder.

Operation of the interframe vector quantization encoder of the seventh embodiment shown in FIG. 32 will be described. If the raster scan video signal $S_{g1}$ in the f-th frame is made input signal series $S_{rf}$, the prediction error signal series $S_{g6}$ as difference between the input signal series $S_{rf}$ calculated by the subtractor 6 and $P_{rf}$ of the prediction signal series $S_{g5}$ from the frame memory 3 is made $e_{rf}$, the reproduction prediction error signal series $S_{g7}$ reproduced by the raster circuit 560 is made $\hat{e}_{rf}$, the reproduction video signal series $S_{g8}$ is made $\hat{S}_{rf}$, and prediction signal series $S_{g5}$ obtained as the reproduction video signal series supplied with delay of one frame period by the frame memory 3 is made $P_{rf}$, it follows that $$e_{rf} = S_{rf} - P_{rf}$$

$$\hat{e}_{rf} = e_{rf} + Q$$

$$\hat{S}_{rf} = P_{rf} + \hat{e}_{rf} = S_{rf} + Q$$

$$P_{rf} = \hat{S}_{rf} Z^{-t}$$

Wherein, Q represents vector quantization error, and $Z^{-t}$ represents delay of one frame period by the frame memory 3. This is basically DPCM system between frames. In the DPCM system between frames, the prediction error signal series $S_{g6}$ calculated by the subtractor 6 is inputted to the significance/insignificance discrimination circuit 590 and the block constituting circuit 510. In the significance/insignificance discrimination circuit 590, the threshold value is set by the feedback control signal $S_{g9}$ from the transmission buffer 511 and the significance/insignificance information $S_{g10}$ (e.g., significance is "1" and insignificance is "0") is outputted. The block constituting circuit 510 takes the prediction error signal series $S_{g6}$ and the significance/insignificance information $S_{g10}$, and only the picture elements deemed to be significant are brought together per K elements (K: plural number) into the block signal $S_{g11}$ as $x=(x_1, x_2, \ldots, x_R)$ and then outputted. If the number of the significant picture elements within one frame does not become a multiple of K, dummy data (e.g., "0") is inserted to constitute one block. The mean value separation normalizing vector quantization encoder 7 taking the block signal $S_{g11}$ quantizes the block signal $S_{g11}$ by mean value, variance and index and makes it quantization output $S_{g2}$. The variable length encoder 517 converts the quantization output $S_{g2}$ and the significance/insignificance information $S_{g10}$ in variable length encoding. In one method, for example, the significance/insignificance information $S_{g10}$ is converted into run length encoding, and the quantization output $S_{g2}$ is assigned with codes having short code length for data of high appearing frequency and with codes having long code length for data of low appearing frequency. The transmission buffer 511 inputting these codes transmits the codes as encoding output $S_{g3}$ to the transmission path and totalizes the information amount at any period (e.g., per frame or per field) and outputs the feedback control signal $S_{g9}$ by the totalization into the significance/insignificance discrimination circuit 590 so as to control the information amount. In the mean value separation normalizing vector quantization decoder 9, from the quantization output $S_{g2}$ quantized by mean value, variance and index, the reproduction block signal $S_{g12}$ is encoded and reproduced as $x=(x_1, x_2, \ldots, x_R)$. By the raster circuit 560 taking the significance/insignificance information $S_{g10}$, components $x_1, x_2, \ldots, x_R$ of x of the reproduction block signal $S_{g12}$ are assigned only to the significant picture element, and code "0" is assigned to the insignificant picture elements, thereby $\hat{e}_{rf}$ of the reproduction prediction error signal series $S_{g7}$ is reproduced. The adder 10 adds $\hat{e}_{rf}$ of the reproduction prediction error signal series $S_{g7}$ to $P_{rf}$ of the prediction signal series $S_{g5}$ from the frame memory 3, and the added output is stored as $\hat{S}_{rf}$ of the reproduction video signal series $S_{g8}$ to the frame memory 3.

According to the embodiment as above described, in the interframe vector quantization encoder, significance/insignificance discrimination is performed to the prediction error signal series being the difference between frames of the video signal, and only the significant picture elements are brought together into a block and the mean value separation normalizing vector quantization encoding is performed. Accordingly, noise in block formation is reduced in the video signal and the video transmission at high quality is achieved.

Eighth Embodiment

Before describing an eighth embodiment of the invention specifically, background art as the basis of the eighth embodiment will be described referring to FIGS. 33 and 34.

FIG. 33 is a block diagram of a motion video transmission apparatus as background art of the eighth embodiment. In FIG. 33, similar parts to those in FIGS. 1 through 32 are designated by the same reference numerals. In FIG. 33, numeral $S_{g1}$ designates digital video input data, numeral 630 an input double buffer, numeral 640 a transmission double buffer, numeral 517 a variable length encoder, numeral 760 a receiving double buffer, numeral 770 a variable length decoder, numeral 780 an output double buffer, numeral 900 a monitor, numeral $S_{g20}$ video output data, numeral 810 a transmission path, numeral $S_{g30}$ a camera synchronization signal, numeral $S_{g40}$ a transmission double buffer changing signal, and numeral $S_{g50}$ a monitor synchronization signal. The input double buffer 630, the variable length encoder 517 and the transmission double buffer 640 are installed within a video transmitter 600.

FIG. 34 is a timing chart illustrating operation of the apparatus in FIG. 33. In FIG. 34, W represents writing of the buffer, R represents reading from the buffer, and $\ldots$, (n−1), (n), (n+1), $\ldots$ represent the number of transmitted frames.

Operation of the apparatus in the prior art will be described.

At the transmitting side, the digital video data $S_{g1}$ is inputted from the camera 8 continuously at intervals of camera synchronization and written to the input double buffer 630 ("double buffer" being hereinafter referred to as "DB") on one side thereof (A side) by an amount corresponding to one frame. Then, the transmission DB640 writes the preceding frame data and reads the further preceding data. As soon as these procedures are finished, the changing of read/write of the input DB630 is performed and the video data are read for encoding. While the reading for encoding is performed, the input data $S_{g1}$ from the camera 8 are not written in the input double buffer 630 but are subjected to time lapse. Subsequently, the next video data from the camera 8 corresponding to one frame are written to the other side (B side) of the input DB630, and a similar operation is repeated. Next, the video data read from the input DB630 are encoded by the variable length encoder 517 and written to one side (C side) of the transmission DB640. Then at other side (D side) of the transmission DB640, the video data of the preceding frame is read and transmitted to the transmission path 810. As soon as reading and writing in the transmission DB640 are finished, the changing of read/write is performed and the written data are read out and transmitted. A similar operation is repeated. In the case that encoding is performed at variable length and the transmission time varies, the time from start of reading by the input DB630 up to finishing of writing to the transmission DB640 is made less than the minimum value of the transmission time, thereby the transmission is performed without lowering the transmission efficiency.

On the other hand, at the receiving side, received data is written to one side (E side) of the receiving DB760. At other side (F side), data of the preceding frame is read thereto for decoding and the reading is previously finished. When the writing is finished, the changing of read/write of the receiving DB760 is performed, and the reading of written data and writing of the next data are started. A similar operation is repeated. The data read from the receiving DB760 is decoded by the variable length decoder 770, and written to one side (G side) of the output DB780. At other side (H side), corresponding to synchronization of the monitor 900, reading of the preceding frame data is repeated and made the video output $Sg_{20}$. The output DB780 changes read/write at the break of next monitor output after ending of writing, and reads the written data and outputs it to the monitor 900. Writing to the output DB780 is started when next decoding data comes. A similar operation is repeated.

In the motion video transmission apparatus as above described, the time from inputting of the picture image from the camera 8 at transmission side (time W(n) of the input DB630) up to starting of the transmission (the beginning of R(n) of the transmission DB640) nearly becomes the sum of the preceding transmission time and the further preceding transmission time (R(n−1) and R(n−2) of the transmission DB640) subtracted by one synchronization time, and the interval of time lapse (interval from W(n) to W(n+1) of the input DB630) nearly becomes the transmission time of the further preceding frame (R(n−2) of the transmission DB640). Moreover, the time of the frame reproduced to the monitor 900 at the receiving side (repetition time of R(n) of the output DB780) nearly becomes the receiving time of next frame (time of W(n+1) of the receiving DB760).

The outline of the eighth embodiment will now be described.

In the eighth embodiment, per every frame subjected to time lapse in an input double buffer, different time intervals correspond to reading time of the preceding frame read depending on the state of a transmission double path from a transmission buffer. Depending on the writing time of a receiving buffer being the same as the reading time, the number of repeated reading times of one frame in the output buffer is controlled. Consequently, the time-lapse picture image is reproduced as a smooth picture image without lowering the transmission efficiency.

The eighth embodiment will be described referring to FIGS. 35 through 37.

In FIGS. 35 through 37, similar parts to those in FIGS. 1 through 34 are designated by the same reference numerals and the detailed description will be omitted. Numeral 650 designates an input double buffer control device installed at the side of a transmitter 600. The input double buffer control device 650 corresponds to input buffer control means, and outputs the input double buffer control signal $Sg_{60}$ based on camera synchronous signal $Sg_{30}$ and transmission double buffer changing signal $Sg_{40}$, and thereby controls the input double buffer 630 in read/write and changing. On the other hand, numeral 790 designates an output double buffer control device installed at the side of a receiver 700. The output double buffer control device 790 corresponds to output buffer control means, and outputs the output double buffer control signal $Sg_{80}$ on monitor synchronous signal $Sg_{50}$ and receiving double buffer changing signal $SG_{70}$, and thereby controls the output double buffer 780 in read/write and changing.

The operation of the eighth embodiment in the abovementioned constitution will be described, referring to a timing chart shown in FIG. 36.

At transmitting side, the digital video data $Sg_1$ is inputted from the camera 8 continuously at intervals of camera synchronization and written to the input Db630 on one side (A side) per frame repeatedly. The previously written data is erased at the next writing and updated. The input DB630 is changed at the break of next camera input after the writing and reading at the transmission DB640 are finished, and the input DB630 reads data written finally. Then at other side (B side) of the input DB630, writing is started and a similar operation is repeated. Data read from the input DB630 is transmitted in an operation similar to the prior art. In this case, the time from the starting of reading by the input DB630 up to the finishing of writing to the transmission DB640 added by one frame time of the camera is made less than the minimum value of the transmission time; thereby the transmission can be performed without lowering the transmission efficiency.

At the receiving side, operation of the receiving DB760 is similar to the background art of FIGS. 33 and 34. Data is decoded by the variable length decoder 770, and then written to one side (G side) of the output DB780. At other side (H side) of the output DB780, data of the preceding frame is read in synchronization with the monitor 900 repeatedly, and outputs the read data as the video output data $Sg_{20}$. The number of reading times corresponding to the receiving time of the previous frame, i.e., the writing time of the receiving DB760 (equal to the transmission time, i.e., the reading time of the transmission DB640) is previously stored, and outputting is performed by the stored number.

Count of the number of reading times is achieved, for example, by circuit the constitution shown in FIG. 37. In this constitution, the number of times of the monitor synchronization during W(n−i) of the receiving DB760 shown in FIG. 36 is counted. In FIG. 37, numeral 810 designates a counter, numeral 820 a latch, numeral 830 a memory, numeral $SG_{100}$ a receiving DB changing pulse, numeral $Sg_{200}$ a monitor synchronization pulse, numeral $Sg_{300}$ the count value of the counter 810, and numeral $Sg_{400}$ the output of the latch 820. The value in $Sg_{400}$ represents the number of reading times corresponding to the receiving time, and is stored to the memory 830.

Subsequently, the changing of read/write of the output DB780 is performed, and a similar operation is repeated. If writing to the output DB780 of the following frame is not finished even at exceeding the number of reading times of the output DB780, the number of reading times is increased. On the contrary, if writing to the receiving DB760 of further following frame is finished before attaining to the number of reading times, reading from the receiving DB760 is delayed and the number of reading times of the output DB780 is decreased, thereby the video output $Sg_{20}$ is continuously outputted in adaptation.

In the motion video transmission apparatus of the eighth embodiment as above described, the time from inputting of the picture image form the camera 8 at transmission side up to the starting of the transmission and the interval of time lapse nearly become the transmission time of the preceding frame (R(n−1) of the transmission DB640. Moreover, the time of the frame reproduced to the monitor 900 at the receiving side is controlled to become nearly the receiving time of the preceding frame (W(n−1) of the receiving DB760; thereby these become nearly equal (transmission time-≈receiving time). According, the time-lapse picture image is reproduced as a smooth picture image without lowering the transmission efficiency.

Although the double buffer is installed as output buffer in the embodiment, if timing of writing and reading is difficult to be taken in time relation, the buffer may be controlled at three times or more. This applies also to the other buffers.

According to the eighth embodiment as above described, the input double buffer is controlled in read/write and changing based on the camera synchronization signal and the changing signal of the transmission double buffer, and the video data from the camera is updated per frame and written and the changing of write/read is performed from the next frame after the changing of the transmission double buffer by the input double buffer control means. The output double buffer is controlled in read/write and the changing based on the monitor synchronization signal and the changing signal of the receiving double buffer, and the number of repeated reading times in the output double buffer corresponds to the writing time of the preceding frame to the receiving double buffer by the output double buffer control means. Accordingly, the time-lapse picture image is reproduced as a smooth picture image without lowering the transmission efficiency.

What is claimed is:

1. A vector quantization apparatus wherein a binary tree k-dimensional vector space has n steps and 2 branches are partitioned from each node of each step and nodes of $2^n$ in number are provided at the n-th step, and when input signal vectors formed in a block per every k elements and an output vector index corresponding to inputted branches are inputted to nodes of a space $R^k$, a vector code table which selects one branch among branches partitioned from each node and outputs the output vector index corresponding to the selected branch and stores in a vector code index the output vector corresponding to each branch partitioned from the node, and a distortion operation circuit which calculates distortion between each vector index stored in said vector code index and the input signal vector and estimates the output vector index to minimize the distortion, are provided in an encoder of each step, and an output vector index is outputted from an encoder of the following step based on the output vector index outputted from the encoder of each step and the input vector and the output vector index outputted from the n-th step is estimated, characterized in that an initial pseudo output vector index which is not overlapped with a pseudo output vector index having equality of code length achieved by adding code "0" at the upper position of the output vector index of shorter code length is inputted to the encoder of the first step, and a pair of output vectors designated by the pseudo output vector index and the initial pseudo output vector index has the vector code table of the encoders of other steps.

2. A vector quantization apparatus as set forth in claim 1, wherein the initial pseudo output vector index comprises "1" (BIN) at least significant bit only, and "0" (BIN) in the required number at higher order bit or bits.

3. A vector quantization apparatus as set forth in claim 1, wherein a required number of encoders are connected in series, each encoder comrising:
   an input vector register for receiving an input vector;
   a vector code table for adding a required number of codes "0" to upper bits of said output vector index and making it pseudo output vector index so that bit length of the pseudo output vector index is coincident with that of said output vector index to be estimated and outputting two vectors corresponding to two points at the branch front of the binary tree using the inputted pseudo output vector index as address input;
   a distortion operation circuit for calculating distortion between the two output vectors and the input vector;
   a distortion comparison circuit for comparing two distortions calculated by said distortion operation circuit and outputting a distortion comparison result signal ("1" or "0"); and
   a pseudo index shift register for shifting the inputted pseudo output vector index by one bit to the upper bit direction and deleting the most significant bit and adding the distortion comparison result signal as the least significant bit and outputting it as pseudo output vector index;
   and further the initial pseudo output vector index to be inputted to the first step is set so that all pseudo output vector indexes to be inputted to each step are not overlapped with each other.

4. A vector quantization apparatus as set forth in claim 1, wherein all output vectors using the pseudo output vector index as address are stored in vector code tables of the encoders of all steps.

* * * * *

UNITED STATES PATENT AND TRADEMARK OFFICE
CERTIFICATE OF CORRECTION

PATENT NO. : 4,769,826

DATED : September 6, 1988

INVENTOR(S) : Tsutomu Kubo et al.

It is certified that error appears in the above-identified patent and that said Letters Patent is hereby corrected as shown below:

```
Column 4, line 27, "present" should be --preset--.
Column 6, line 18, "means" should be --mean--.
Column 8, line 12, "correspond" should be --corresponding--.
Column 9, line 11, "transformed" should be --transferred--;
          line 15, "sigal" should be --signal--;
          line 61, "v_x" should be --v_y--.
Column 10, line 41, "Emobodiment:" should be --Embodiment:--.
Column 11, line 9, after "frame" the period "." should be a comma --,--.
Column 12, line 21, "added" should be --adder--;
           line 24, cancel "of".
Column 13, line 27, "fram" should be --frame--.
Column 15, line 45, "quantizatin" should be --quantization--.
Column 17, line 10, "the" (second occurrence) should be --The--.
Column 19, line 21, "on" should be --an--.
Column 20, line 37, "multplication" should be --multiplication--.
Column 21, line 33, "discrimination" should be --discriminates--.
Column 25, line 41, delete "an".
Column 26, line 21, "evey" should be --every--.
Column 30, line 22, delete "a".
Column 31, line 44, "designated" should be --designates--
Column 32, line 46, before "the" (first occurrence) insert --as--;
           same line, delete "the" (second occurrence).
```

UNITED STATES PATENT AND TRADEMARK OFFICE
CERTIFICATE OF CORRECTION

PATENT NO. : 4,769,826

DATED : September 6, 1988

INVENTOR(S) : Tsutomu Kubo et al.

It is certified that error appears in the above-identified patent and that said Letters Patent is hereby corrected as shown below:

Column 36, line 18, after "$S_{g80}$" insert --based--;
line 27, "Db630" should be --DB630--.

Signed and Sealed this

Twenty-seventh Day of March, 1990

*Attest:*

JEFFREY M. SAMUELS

*Attesting Officer*   *Acting Commissioner of Patents and Trademarks*